(12) United States Patent
Horie

(10) Patent No.: US 7,092,335 B2
(45) Date of Patent: Aug. 15, 2006

(54) DATA RECORDING OR ERASING METHOD FOR AN OPTICAL RECORDING MEDIUM

(75) Inventor: Michikazu Horie, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 340 days.

(21) Appl. No.: 10/686,760

(22) Filed: Oct. 15, 2003

(65) Prior Publication Data

US 2005/0078577 A1  Apr. 14, 2005

Related U.S. Application Data

(63) Continuation of application No. 09/942,277, filed on Aug. 27, 2001, now Pat. No. 6,671,249, which is a continuation of application No. PCT/JP00/09016, filed on Dec. 20, 2000.

(30) Foreign Application Priority Data

Dec. 28, 1999 (JP) .................................. 11-374645
Mar. 10, 2000 (JP) .................................. 2000-67051

(51) Int. Cl.
*G11B 27/36* (2006.01)
*G11B 5/09* (2006.01)

(52) U.S. Cl. ................ 369/53.2; 369/47.22; 369/30.03

(58) Field of Classification Search ..................... None
See application file for complete search history.

(56) References Cited

U.S. PATENT DOCUMENTS

| 5,173,886 A | | 12/1992 | Satoh et al. | |
|---|---|---|---|---|
| 5,214,627 A | * | 5/1993 | Nakashima et al. | ..... 369/53.22 |
| 5,694,381 A | | 12/1997 | Sako | |
| 5,717,683 A | * | 2/1998 | Yoshimoto et al. | ...... 369/275.3 |
| 5,721,856 A | | 2/1998 | Takeuchi | |
| 6,044,049 A | * | 3/2000 | Fujiune et al. | ........... 369/44.29 |
| 6,044,436 A | * | 3/2000 | Otsuka | ........................ 711/112 |
| 6,078,559 A | | 6/2000 | Takemura et al. | |
| 6,163,521 A | * | 12/2000 | Konishi et al. | .......... 369/275.3 |
| 6,189,014 B1 | * | 2/2001 | Nakashima et al. | ........ 707/200 |
| 6,223,247 B1 | * | 4/2001 | Otsuka et al. | .................. 711/4 |
| 6,310,854 B1 | | 10/2001 | Sato et al. | |
| 6,580,684 B1 | * | 6/2003 | Miyake et al. | ............ 369/47.21 |
| 6,606,290 B1 | * | 8/2003 | Tosaki et al. | ............. 369/53.21 |

FOREIGN PATENT DOCUMENTS

| CA | 2161922 | 5/1996 |
|---|---|---|
| EP | 0 626 646 | 11/1994 |
| EP | 0712130 A1 | 5/1996 |
| EP | 0 893 794 A2 | 1/1999 |

(Continued)

OTHER PUBLICATIONS

IEC 908 "Audio Recording -Compact Disc Digital Audio System" $2^{nd}$ Edition. 1990-02.

(Continued)

*Primary Examiner*—Thang V. Tran
(74) *Attorney, Agent, or Firm*—Katten Muchin Rosenman LLP

(57) ABSTRACT

For an optical recording medium having a phase change type recording layer on it's a substrate and having as read only area and a writable area in a recording area, a data recording method is provided which records data in the writable area. This data recording method comprises a transfer step of transferring program data recorded in the read only area in a practical form to an external computer, and an execution step (step A10) of automatically executing the program data in the external computer to record data in the writable area, which can facilitate manufacturing and reduce the possible of destruction or falsification of ROM data.

21 Claims, 20 Drawing Sheets

FOREIGN PATENT DOCUMENTS

| | | |
|---|---|---|
| EP | 0936601 A1 | 8/1999 |
| EP | 1006514 A1 | 6/2000 |
| EP | 1006515 A1 | 6/2000 |
| EP | 1 056 077 | 11/2000 |
| JP | 61-005442 | 1/1986 |
| JP | 63-000833 | 1/1988 |
| JP | 63-291227 | 11/1988 |
| JP | 02-294933 | 12/1990 |
| JP | 03-097046 | 4/1991 |
| JP | 03-217972 | 9/1991 |
| JP | 08-147702 | 6/1996 |
| JP | 09-055034 | 2/1997 |
| JP | 9-231612 | 9/1997 |
| JP | 09-231612 | 9/1997 |
| JP | 10-003697 | 1/1998 |
| JP | 10-172149 | 6/1998 |
| JP | 11-039718 | 2/1999 |
| JP | 11-176020 | 7/1999 |
| JP | 2000-076076 | 3/2000 |
| JP | 2000-285463 | 10/2000 |
| JP | 2001-043619 | 2/2001 |
| WO | WO98/18121 | 4/1998 |

OTHER PUBLICATIONS

ECMA Volume and File Structure of CDROM for Information Interchange, 2$^{nd}$ Edition Dec. 1987.

* cited by examiner

PACKET STRUCTURE

READ ONLY AREA

ADDITIONAL DATA OF PRE-PITS ROW A
PRE-PITS ROW A
ADDITIONAL DATA OF PRE-PITS ROW B
PRE-PITS ROW B

INFORMATION RECORDABLE AREA

ADDITIONAL DATA OF GROOVE A
GROOVE A AND RECORDED MARK
ADDITIONAL DATA OF GROOVE B
GROOVE B (NON-RECORDED)

DATA RECORDING OR ERASING METHOD FOR AN OPTICAL RECORDING MEDIUM

This application is a continuation of Ser. No. 09/942,277, filed Aug. 27, 2001 now U.S. Pat. No. 6,671,249, which is a continuation of PCT/JP00/09016, filed Dec. 20, 2000.

TECHNICAL FIELD

The present invention relates to a rewritable phase change type optical disc including a ROM area partially, and to a system for performing rewrite in a RAM section without inadvertently overwriting ROM data in the disc, and more particularly to a ROM/RAM-mixed rewritable compact disc.

BACKGROUND ART

In the recent years, optical discs have come into widespread use as a recording medium suitable for distribution, duplicate and retention of a large volume of data. Of these optical discs, a CD-format read only disc (CD-ROM), a recordable disc (CD-R) and a rewritable disc (CD-RW) constitute the most widespread optical disc family. A feature of the CD-ROM, CD-R and CD-RW pertaining to a CD family is an attribution of data thereof, with they being used properly on the basis of the data attributions.

The CD-ROM disc is of a type suitable for use in transferring data onto a substrate in the form of dented pits for duplicating the data with the same contents in large numbers. On the other hand, the CD-R or CD-RW is of a type permitting arbitrary additional recording or rewrite of data, and is thus suitable for data retention or the like at private levels. Of these, the CD-RW has been expected as an inexpensive, large-capacity backup recording medium substituting for floppy discs or MO discs.

A primary difference between a recorded data signal on a CD-RW and a data signal on a conventional CD-ROM (reflectivity of more than approximately 60%) is only that the reflectivity is lower by approximately 15 to 25%, and if the existing drive is designed to handle a low reflectivity, then the compatibility is achievable in a wide range. In fact, many CD-ROM drives have already handled it.

In addition, Japanese Laid-Open (Kokai) No. HEI 11-250522 (which sometimes will be referred to hereinafter as a "well-known document") discloses a technique about a hybrid structure including a non-rewritable aluminum reflection area and a rewritable phase change reflection area. According to the technique disclosed in this well-known document, a non-rewritable recording area, which inhibits rewrite and erase through the use of a dedicated format, is provided in a CD-RW medium while the remaining area is used as a rewritable recording area so that, for read and write, a dedicated CD-RW drive is employed which is capable of restricting write/read by the format dedicated to the non-rewritable recording area.

Still additionally, a large number of drives each capable of recording on both the CD-R and CD-RW media (also capable of rewriting on the CD-RW) have been designed on the basis of the CD-R drive developed prior to the CD-RW, and put on the market.

Rewritable type discs (Partial ROM, P-ROM) having a read only (ROM) area in a section of its information recording area are preferable because of enabling both data distribution and user data recording, and the CD family is likewise required to realize them.

So far, as a write-once type compact disc (CD-R) or rewritable type compact disc (CD-RW), there has been proposed a disc (hybrid disc) in which, through the use of a multisession format, only a first session is used for ROM data while a second session and sessions subsequent thereto are used as a recordable partial ROM area.

However, for the recording of data in the form of fixed-length packets through the use of a format other than the multisession, there is no rule for when specific packets are employed as a ROM area.

Moreover, in the case of the hybrid disc, since the multisession format prescribed or defined originally for the CD-R is directly used for the CD-RW, considerations are also given to only the recordable function with respect to the second session forming a rewritable (RAM) area and subsquent sessions.

For this reason, there arises a need to realize a ROM/RAM-mixed disc (Partial ROM, P-ROM disc), which has a ROM area comprising a pre-pits row and freely rewritable RAM area, by the use of the CD-RW.

With such a ROM/RAM-mixed disc, there is a need to read out data from the ROM area and the RAM area without use of separate readout circuits, and there is a need to inhibit substantial distinction from the readout system side.

Meanwhile, in the recording, the writing in the ROM area is impossible while the recorded data in the RAM area is rewritten by overwrite; therefore, there is a need to distinctively deal with both the data in at least a recording system.

As a conventional example, among magneto-optical discs, there exists a disc having a ROM area comprising a pre-pits row partially. The ROM area is coated as a reflective layer with a recording medium identical to that of the RAM area. However, in the case of the magneto-optical medium, the readout of data originally comprising a pre-pits row involves detection of variation in reflectivity strength while the detection of a magneto-optical signal involving detection of variation in polarization through a complex polarization optical system. That is, since a readout optical system achieves easy distinction, a characteristic exists that, even if a magneto-optical signal is recorded in a pre-pits row by mistake, this does not affect a signal readout system at all, thus preventing destruction of the ROM data.

In the meantime, also for a phase change medium, in view of manufacturing, it is also preferable that the ROM/RAM areas have the same multilayer structure. However, since the readout signal from the ROM area comprising a pre-pits row and the readout signal from the RAM area are obtainable through the use of the same optical system, a phase change recorded signal (physically rewritable signal obtainable by a mark row formed on the basis of the difference in property from a peripheral area in a phase change recording layer), by contrast, is overwritten on the pre-pits row to superimpose a RAM recording signal on the pre-pits data, which can destroy the ROM data.

Currently, although there is an example in which write inhibit is made in units of files on an operating system and the definition of a read only file takes place, the reliability is low because of easy alteration/falsification. No prescription about write inhibit or ROM data attribution exists, as it is, at the logical format level in units of bits or blocks of digital data in lower-order than file attribution.

In the case of a P-ROM disc using a phase change medium, a recording system is required to recognize a ROM area without depending upon an operating system, or to inhibit rewriting in a recorded area and recognize it as a ROM area thereafter. In particular, a phase change type CD-RW disc, prescribed such that an intended read only compact disc and data format/readout signal are the same in physical characteristics, is required to seize a ROM area and a RAM area in a recording system.

Among concrete applications for a P-ROM utilizing a phase change medium, there are textbooks for use in repeated practice of languages or music presented in the form of CDs. In such applications, a sentence of a foreign language or a measure of a music, serving as a model (demonstration), is read out as application data to call upon a user to repeat it, and the user immediately records the repeated contents to put them as new input information in a user data area.

Heretofore, although such an application has been done with a cassette tape, after the demonstration, i.e., readout, a need for complex works exists, such as head search of a tape and switching to readout/recording modes for recording the "repetition". Although there are some cases using a solid-state memory device instead, since limitation is imposed on the recording capacity, difficulty is experienced in dealing with a large volume of demonstration data for a long period of time. In addition, because of the employment of a high-class compression technique to reduce data volume, a delicate nuance, which is said to be necessary for the practice of languages or music, can drop out from the data. With a capacity of 650 to 700 MB like CD-RW, it is possible to accumulate voice data equivalent in quality to that of CD even with almost no compression, or to further increase the voice data volume through the use of a voice compression technique such as MP3.

The employment of an image compression technique such as JPEG or MPEG1 enables still picture and moving picture demonstrations and recording.

Meanwhile, in general, the demonstration is divided in units of several seconds to several tens seconds in order to facilitate the repetition, and the recording of the demonstration and user data are required to be made repeatedly within a given time length, so there is a need to shorten the time needed for the switching in recording between the demonstration and the user data to the utmost.

Accordingly, if an application program is stored on one CD-RW disc and the program and demonstration data are read out therefrom to conduct the demonstrations and user data involving repeated data is then recorded on the same CD-RW disc, this is extremely convenient, for that recording and readout become feasible with the same recording/readout apparatus.

Moreover, commonly, for such an application, two kinds of data: a main routine comprising an executive program and a demonstration data collection comprising a plurality of contents, are collected as ROM data. For example, here the main routine is such a program as a menu screen appears as an user interface to execute various types of processing according to selection by the user. When the user selects the execution of a specified demonstration in the menu screen, selected data is acquired from the demonstration data collection so that the demonstration is implemented by means of a program of the main routine.

In this case, if the user updates only the demonstration data collection without changing the main routine, discs for the purpose of small-volume many-kind application distribution are producible with high efficiency. In view of the actual circumstance of computer-aided publishing, an extremely urgent and important requirement is that, instead of a simple CD-ROM, small-volume many-kind application discs are produced as ROM data capable of updating partially.

It is an object of the present invention to provide a P-ROM, data recording method, data readout method and data erase method easy to produce and providing less possibility of destruction or falsification of ROM data, and more particularly to provide an optical recording medium, data recording method for rewritable phase change type optical disc, data erase method for rewritable compact disc, data erase method for rewritable phase change type recording medium, read only data erase method, and recording/readout apparatus.

More concretely, the present invention relates to a rewritable compact disc having both a read only area and rewritable area.

DISCLOSURE OF INVENTION

For the foregoing purpose, in accordance with a first point of the present invention, there is provided an optical recording medium comprising a substrate having a phase change type recording layer, and having a read only area and a rewritable area in its information recording area, wherein the read only area and the rewritable area have the same multilayer structure, and data and address information in the read only area and the rewritable area comprise basic data units having the same logical structure, and auxiliary data capable of distinguishing between read only data and rewritable data is provided in the unit or in a data unit including a plurality of data units each corresponding to the unit.

Accordingly, this enables handling intended rewriting data as logical ROM data. Moreover, for example, a CD-RW is apparently used as a write-once type medium.

In addition, in accordance with a second point of the present invention, in the arrangement of the optical recording medium according to the above-mentioned first point, an address to be added to the basic data unit and the auxiliary data are written previously on the substrate in the rewritable area and the read only area.

Still additionally, in accordance with a third point of the present invention, in the arrangement of the optical recording medium according to the above-mentioned first or second point, information in the read only area is obtained by a plurality of pre-pits rows made on the substrate.

Moreover, in accordance with a fourth point of the present invention, in the arrangement of the optical recording medium according to the aforesaid second point or third point, a groove is formed in the rewritable area to have a wobble made so that a center line thereof shows a predetermined amplitude with respect to a recording/readout optical beam scanning direction, while a center line of a pre-pits row in the read only area wobbles to show an amplitude substantially equal to the amplitude of the groove with respect to the optical beam scanning direction, and consecutive address information is given by the wobble of the groove and the wobble of the center line of the pre-pits row.

Still moreover, in accordance with a fifth point of the present invention, in the arrangement of the optical recording medium according to the aforesaid fourth point, a carrier frequency due to the wobble of the groove and the wobble of the center line of the pre-pits row is frequency-modulated or phase-modulated with digital information to provide auxiliary data.

Accordingly, with this arrangement, in a P-ROM disc in which a physical ROM area comprising pre-pits or th aforesaid logical ROM area and a RAM area are formed in a mixed state and they are covered with a phase change medium, it is possible to overwrite the ROM data, thus preventing the destruction and falsification of the ROM data.

In addition, in accordance with a sixth point of the present invention, in the optical recording medium according to the aforesaid first point, information in the read only area is acquired by a mark row formed on the basis of a difference in optical characteristics from a peripheral area in a phase change recording layer, and write inhibiting processing is conducted with respect to the mark row.

Thus, a rewritable area with a write-once (first-time writable) attribution is distributed to a user in a non-recorded state so that the user receives it as a pseudo write-once medium which permits write-once (first-time writable).

Still additionally, in accordance with a seventh point of the present invention, in the arrangements of the optical recording media according to the aforesaid first to sixth points, fixed-length data is used as the basic data unit containing the auxiliary data.

Thus, it is possible to surely provide a data attribution representative of whether it is "rewritable" or "read only", at a lower level in a recording/readout drive unit.

Moreover, in accordance with an eighth point of the present invention, in the arrangements of the optical recording media according to the aforesaid first to seventh points, data in an information recording area is an eight to fourteen modulation signal (EFM signal) compatible with a compact disc.

Still moreover, in accordance with a ninth point of the present invention, in the arrangement of the optical recording medium, a prescription on the rewritable attribution or the read only attribution is placed in an absolute time in pre-groove (ATIP) frame.

Furthermore, in accordance with a tenth point of the present invention, in the arrangement of the optical recording medium according to the aforesaid ninth point, ATIP information is stated in terms of an absolute time of a two-digits BCD code in units of minutes, seconds or frames, and when the most significant bits in eight bits for expression of the minute, second and frame are respectively taken as M1, S1 and F1, the attribution is prescribed in a state associated with any one of (0, 0, 0), (0, 0, 1), (0, 1, 0) and (0, 1, 1) of (M1, S1, F1) in a program area.

Still furthermore, in accordance with an eleventh point of the present invention, in the arrangement of the optical recording medium according to the aforesaid eighth point, a prescription on the rewritable attribution or the read only attribution is placed in an EFM frame.

Yet furthermore, in accordance with a twelfth point of the present invention, in the arrangement of the optical recording medium according to the eleventh point, the attribution of a frame specified by the subcode is prescribed in a state associated with specific two bits in a Q-channel of the subcode.

In addition, in accordance with a thirteenth point of the present invention, in the arrangement of the optical recording medium according to the eighth point, a prescription on the rewritable attribution or the read only attribution is placed in a block.

Still additionally, in accordance with a fourteenth point of the present invention, in the arrangement of the optical recording medium according to the thirteenth point, the attribution of the block is prescribed in a state associated with specific two bits in a plurality of bits describing mode information included in a header of the block.

Moreover, in accordance with a fifteenth point of the present invention, in the arrangements of the optical recording media according to the first to fourteenth points, the attribution on whether or not to be rewritable includes an attribution on whether or not to be rewritable only one time and an attribution on whether or not to be writable repeatedly.

Still moreover, in accordance with a sixteenth point of the present invention, in the arrangements of the optical recording media according to the eighth to fifteenth points, a program area is divided into a plurality of sessions according to a prescription of a multisession format so that some of divided sessions are used for read only while the other sessions are made rewritable.

Yet moreover, in accordance with a seventeenth point of the present invention, in the arrangement of the optical recording medium according to the sixteenth point, the program area is divided into a first session comprising read only data having an ISO9660 file structure and a second session comprising a rewritable type area so that user data and lead-out in the first session are handled as read only data while a lead-in area, a program memory area (PMA) and a power calibration area (PCA) are made rewritable.

Furthermore, in accordance with an eighteenth point of the present invention, in the arrangement of the optical recording medium according to the sixteenth point or seventeenth point, information representative of whether the session pertains to the rewritable attribution or the read only attribution is included in a lead-in area of each session of the multisession format.

Still furthermore, in accordance with a nineteenth point of the present invention, in the arrangement of the optical recording medium according to the eighteenth point, information representative of an optical recording medium having a read only area and a rewritable area is included in special information of the lead-in area or the lead-in area of the first session of the multisession format stated with ATIP.

Yet furthermore, in accordance with a twentieth point of the present invention, in the arrangement of the optical recording medium according to the eighth to eighteenth points, information representative of an optical recording medium having a read only area and a rewritable area is included in EFM data of the lead-in area or the lead-in area of the first session of the multisession format.

Accordingly, with this arrangement, three types of data areas of a master ROM, a post ROM and a RAM can be formed in a state mixed on the same disc. In addition, owing to the ATIP, a rewritable area having a write-once attribution is usable as a pseudo write-once medium on the user side, and the master ROM area is producible on the user side.

In addition, in accordance with a twenty-first point of the present invention, there is provided a data recording method for use in a rewritable phase change type optical disc which has a phase change type recording layer on its substrate and which has a read only area and a rewritable area in its information recording area, comprising of a transfer step of transferring program data recorded in the read only area in a practicable form to an external computer and an execution step of automatically executing the program data in the external computer to record data in the rewritable area.

Thus, this enables conducting doubled write inhibiting processing on the system, thus enhancing the reliability about the ROM data destruction prevention, besides the complete compatibility with the existing formats is achievable.

Still additionally, in accordance with a twenty-second point of the present invention, in the arrangement of the optical recording medium according to the foregoing first point, identification information representative of a rewritable type including a partial read only area is written previously on the substrate in the form of pre-pits or a wobble.

Moreover, in accordance with a twenty-third point of the present invention, in the arrangement of the optical recording medium according to the foregoing twenty-second point, data in the read only area comprises a pre-pits row, and address information in the read only area, together with the identification information, is written previously on the substrate in the form of pre-pits or a wobble, and further file management information on a file included in the read only area and the rewritable area is written in the rewritable area.

Thus, this enables recognizing that, when a disc is inserted into a recording drive, it is a P-ROM disc, and acquiring file management information about the ROM area to save it in a memory on the system. In addition, it is possible to prevent only the file management information from being erased or the disc from being initialized due to overwrite in error to make the access to the ROM area difficult, or to prevent the ROM data from being destroyed by the overwrite without recognizing the presence of the ROM area. Still additionally, the ROM data comprising a pre-pits row is erasable by overwriting different data from the ROM data in the phase change type recording layer in the read only area having the ROM data, so the factory or software manufacturer side, for example, can certainly keep data, undesirable to show to the user side, in secret.

Still moreover, in accordance with a twenty-fourth point of the present invention, there is provided a data erase method for use in a rewritable phase change type recording comprising a substrate medium having a phase change type recording layer, and having a read only area and a rewritable area in its information recording area, comprising a recognition step of recognizing identification information previously written in the form of pre-pits or a wobble on the substrate and representative of that the recording medium is of a rewritable type including a read only area comprising partially a pre-pits row or wobble, a memory transfer step of acquiring address information from the read only area for transferring the address information to a storage unit, an erase step of erasing file management information written in a file management area of the recording medium, and a re-recording step of recording, the address information of the read only area, transferred to the storage unit, into the file management area.

Yet moreover, a twenty-fifth point of the present invention has an arrangement comprising an identification step of identifying, on the basis of information recorded in a lead-in area of the first session area in a compact disc with a multisession format having a plurality of session areas each including a lead-in area, that the compact disc is of a rewritable type having a read only area, an extraction step of extracting an attribution about rewrite, write-once (first-time writable) or write inhibit (read only) from each of the lead-in areas of the plurality of session areas, a memory transfer step of, when the attribution extracted in the extraction step is about the write inhibit (read only), transferring a file structure of the write inhibit (read only) session area to a storage unit, an erase step of erasing information recorded in the lead-in area of the first session area, and a re-recording step of recording the disc identification information, the file structure of the write inhibit session area transferred to the storage unit and a leading address of a rewritable area.

Thus, this enables avoiding the erase of ROM data due to direct overwrite, and further preventing the erase of the ROM data stemming from the failure of a simple erase operation.

Furthermore, in accordance with a twenty-sixth point of the present invention, in the arrangements of the optical recording media having a partial read only area, according to the foregoing first to twentieth, twenty-second and twenty-third points, has the read only area including a first read only area in which data is recorded in the form of a pre-pits row and a second read only area formed by inhibiting re-write after recording of data and has the rewritable area.

Still furthermore, in accordance with a twenty-seventh point of the present invention, in the arrangement of the optical recording medium according to the foregoing twenty-second point, a predetermined updating-unnecessary application program is stored in the first read only area, and an updating-possible or customized application program is stored in the second read only area, and further a user data recording area capable of recording user data related to at least the application program is provided in the rewritable area.

Thus, this enables ROM data to be impossible to be falsified, erased and destroied, and making at least a recording drive seize a ROM area.

Yet furthermore, in accordance with a twenty-eighth point of the present invention, there is provided a recording/readout apparatus in which an application program area containing data of a predetermined application program is formed as a read only area with a read only attribution in specified consecutive areas existing in a program area and a user data recording area capable of recording user data related to at least the application program is set as a rewritable area with a rewritable attribution in the remaining program area of the specified consecutive areas and which is made to read out the application program and record/read out the user data related to the application program, the apparatus comprising recognition means for, when a medium is mounted, recognizing that it is a rewritable phase change type optical disc having a partial read only area partially, program execution means capable of gaining access to the read only area recognized by the recognition means to acquire the application program data for executing the contents of the program, information input means capable of inputting required information in accordance with the application program executed by the program execution means, and recording means capable of gaining access to the user data recording area to record, as user data, the information inputted by the information input means.

With this arrangement, in addition to, for example, language practice, it is possible to store a first-version application program in a master ROM area and store only a portion, needed for correction of the program, in a post ROM area when a need for a partial version-up of the program exists.

Moreover, in accordance with a twenty-ninth point of the present invention, there is provided a read only data erase method for use in an optical recording medium in which a phase change type recording layer is formed on a substrate and read only data is made by a plurality of pre-pits rows formed on the substrate, wherein data different from the read only data is overwritten in the phase change type recording layer for making impossible the readout of the read only data.

Thus, this enables the factory or software manufacturer side, for example, to erase a portion of data to be updated in a master ROM area.

BEST MODE FOR CARRYING OUT THE INVENTION

Figure 1A:
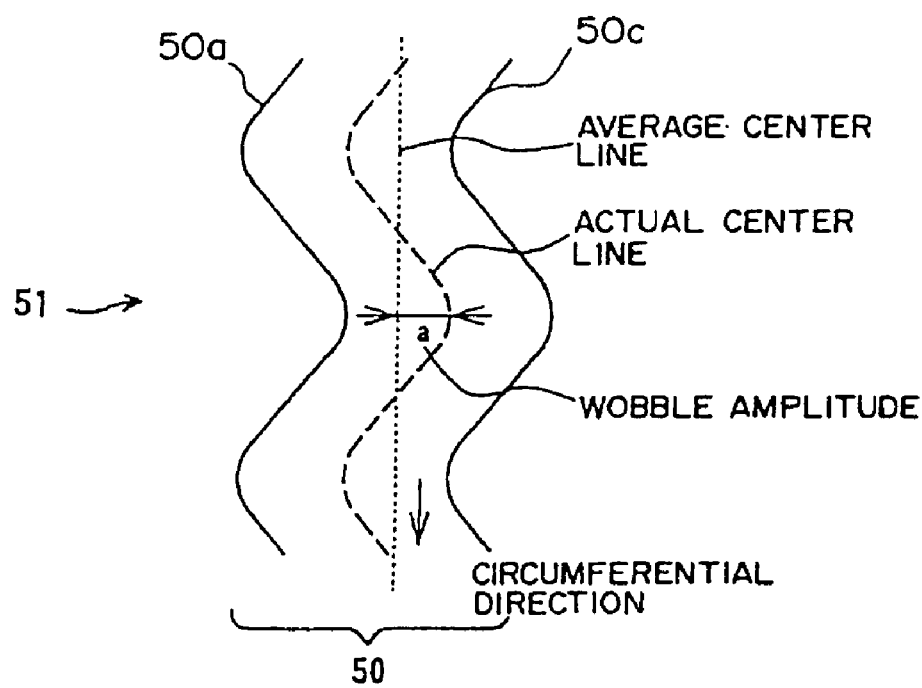
FIG. 1(a) is an illustrative view showing a guide groove in a data non-recorded rewritable area.

Embodiments of the present invention will be described hereinbelow with reference the drawings.

A recording medium according to the present invention is such that a phase change type rewritable recording layer is formed on a substrate. There has hitherto been an example in which a read only information only a recording/readout system can gain access to is written other than a user data writable recording area, whereas in the present invention a read only area is essentially provided in a user data recordable recording area.

A recording area (program area) of a medium according to the present invention includes both a read only area and rewritable area, while a medium with the same layer configuration is used irrespective of a difference in attribution therebetween. In general, such a medium is composed of a phase change type recording layer, a protective layer formed to cover at least one side of the phase change type recording layer, a reflective layer placed on the opposite side to a recording/readout light incidence side of the recording layer, and other layers. Commonly, these layers are all formed by a sputter technique. Regardless of deposit methods, if a recording area is made to have the same multilayer structure and is formed by the same manner, then this simplifies a manufacturing process and is desirable from the viewpoint from a decrease in manufacturing cost. Accordingly, even a ROM area is physically coated with a rewritable phase change type recording layer.

In the present invention, a classification into two types takes place according to ways of giving read only information in a ROM area. One is that a surface of a substrate is deformed, that is, user data is written through the use of a pre-pits row based on irregularities or a wobble and is overcoated with the aforesaid phase change type recording layer. The other is that, after data is recorded (first-time recorded) in the form of a phase change in a partial area, a recording system conducts processing to inhibit re-write in this area (write inhibiting processing). In the present invention, the read only (ROM) data recorded in the form of a pre-pits row(s) will be refereed to hereinafter as "master ROM data", while data made non-rewritable through the write inhibiting process after recorded and handled as read only will be referred to hereinafter as "post ROM data". In the present invention, commonly, the post ROM data is given as a phase change recording signal, that is, a physically rewritable signal obtained by a mark row formed on the basis of a difference in optical property from a peripheral area in the phase change type recording layer. In this connection, in the invention, when a specified area (formed with substantially consecutive recording tracks and addresses) of a program area is filled with ROM data, this area will be called a ROM area.

In the present invention, for production of a host ROM, a write inhibiting attribution (read only) is added previously to a non-recorded rewritable area, but in some cases, a factory or software manufacturer side uses a special recording drive to make a user side confirm the aforesaid read only area as a read only area after distributed.

In addition, there is a possibility that a factory or software manufacturer side rewrites data once or several times for editing purposes or gives new write inhibiting attribution (read only attribution) to edited data after the completion of editing, before distributing to users.

On the other hand, it is also possible that a rewritable area equipped with a write-once (first-time writable) attribution is distributed to a user in a non-recorded state and is given as a pseudo write-once medium being of a type recordable once (first time). In this case, after one-time recording (first-time recording) on the user side, rewrite becomes impossible. That is, even if the rewritable area is of a physically rewritable type, on the user side, it functions as a non-recorded write-once medium. In addition, if the factory or software manufacturer side makes recording in the write-once area and distributes it to the user, likewise the user side can use it as a read only area because of being non-rewritable on the user side.

Meanwhile, rewritable data will be referred to as "RAM data", while a portion of a recording area filled with the RAM data will be referred to as "RAM area". The RAM data is not always recorded in the RAM area from the beginning, and the RAM area is an area in which data is rewritable and which is not subjected to the write inhibiting processing.

The present invention proposes a method in which attributes corresponding to "read only" and "rewritable" are added to data and are identifiable in at least a recording system, and further a medium which includes both data areas prescribed as a ROM and RAM in terms of the attribution. In the invention, the data attribution is set for each basic unit of data. Here, the data basic unit is a unit to be processed collectively in data processing of a recording/readout drive unit, for example, in the cas of a CD format, an ATIP frame in unit of 1/75 seconds in the ATIP and a 98EFM frame of EFM data equipped with a subcode, while in the case of a CD-ROM format, a block comprising data of 2352 bytes. A packet comprising a plurality of blocks (usually, 16 or 32 blocks) is also considered as a basic unit. These are examples in which each data unit capacity is a constant fixed-length data unit. In addition, it is also possible that a ROM or RAM area per se is collectively considered as a track in a CD format, or that, in a case in which a session is established according to a prescription of a CD multisession format, the session is considered as one unit. Still additionally, a packet forming a group of fixed-length blocks which is not necessarily constant in number can also be considered as one data unit. This is an example of a variable-length data unit which is not fixed in data unit capacity.

More generally, user data is partitioned in units of $2^n$ bytes (512, 1024, 2k, 4k, 16k, 64k, ... , and other bytes), and redundance data such as parity bits for error is added thereto to produce a logical minimum basic data unit. Additionally, when a plurality of data units (not limited to fixed length), each corresponding to this basic data unit, are grouped, the grouped data unit is also treated as one kind of basic data unit. Moreover, an address or auxiliary data on data attribution is added according to basic data unit.

In the present invention, preferably, fixed-length data, particularly, an address added minimum unit, is employed as the basic data unit. As a result, it is possible to certainly add a data attribution indicative of "rewritable" or "read only" at lower levels (close to hardware and hard to cover by an operation by a user) of a recording/readout drive unit. A data attribution can also be added to a variable-length data unit formed by grouping a plurality of fixed-length data units; also in this case, it is preferable that the same data attribution is added in units of low-level fixed-length data units.

It is also appropriate that the address included auxiliary data is added to construct a series of bit strings as bit information like the basic unit of the user data, or that the address included auxiliary data is added in a state adjacent to the basic unit of the user data and separated spatially by a different type of signal.

An example of the former is an additional bit string called a subcode in an EFM signal in a CD format which will be mentioned later, while an example of the latter is auxiliary data (ATIP information) depending on a wobble used in CD-R or CD-RW. Alternatively, the auxiliary data to be added can also be a pit row placed between grooves or between pre-pits rows, or a pit row situated before and after a user data string of a basic data unit.

In any case, it is preferable that attribution information of a basic data unit indicative of "read only", "write-once (first-time writable)" or "(repetitive) rewritable", together with address information, is previously written as "non-rewritable" information on a substrate. That is, an address allocated to each basic data unit is previously written on the substrate and the data attribution to be recorded at that address is written in advance at every address, and in this case, it is preferable that the writing manner is stated with a non-rewritable signal. If a design is made such that the recording drive side records data with a predetermined attribution at a predetermined address in accordance with that data attribution information, then this makes it difficult to readily alter the data attribution on the user side, which reduces a possibility of destroying data in a read only area due to overwrite by phase change recording.

Although the non-rewritable signal, mentioned here, is achievable by forming a physical deformation such as a wobble on a substrate by injection molding, if "non-rewritable on the user side", it is also acceptable to use a recording signal depending on the phase change recording. The recording signal of "non-rewritable on the user side" is a signal which is inhibited to rewrite in the user side by means of a special processing such as cipher.

Accordingly, an address and auxiliary data to be added to a basic data unit are previously written in a rewritable area and a read only area on a substrate.

In this case, each of the data, data attribution and address information in a ROM area has the same logical structure as that in a RAM area. That is, they have the same basic data unit, and are made such that the user data is partitioned according to the aforesaid basic unit and the data attribution and address information are added thereto. In consequence, the readout (decode) becomes feasible with the same readout (logical) circuit.

In the RAM area, usually, a concentric or spiral guide grooves are made to allow the guide of an optical beam even in a non-recorded condition. In addition, at this time, it is preferable that a predetermined amplitude is made with respect to a scanning direction of the optical beam. By giving information through the wobble, it is possible to distinguish between a non-rewritable area and a rewritable area. In the case of a disc-like medium, since a guide groove is usually formed into a concentric or spiral configuration, an optical beam takes a scanning action along an almost circumferential direction to follow the guide groove, and the wobble is made to establish an amplitude in radial directions.

Also in a post ROM area, because the recording is made initially, it is preferable to form a guide groove similar to the above-mentioned guide groove.

Furthermore, although a pre-pits row is made in a master ROM area, in this case, it is preferable that pre-pits are made so that the center line of the pre-pits row has a wobble with the almost same signal amplitude as that of the aforesaid guide groove with respect to a scanning direction of a recording/readout optical beam. As a result, it is possible to provide continuous address information in the master ROM area and the rewritable area. In the present invention, including the center line of a pre-pits row, a guide groove is used in a wide sense.

In the present invention, it is particularly preferable that an address is given previously on a substrate through the change of a wobble. Particularly, in a non-recorded RAM area, for access to a predetermined position, referring to an address depending on a wobble shown in FIG. 1(a) has come into widespread use. In FIG. 1(a), in a rewritable area 51, a guide groove 50 is a dented portion defined by being surrounded by groove wall surfaces 50a and 50c, and usually is formed by transferring a projecting configuration of a stamper onto a substrate. In addition, address information is given by a wobble of the guide groove 50, and it is acquired in a manner that laser light reads this groove configuration.

The address depending on the wobble can be given in a manner that a wave (carrier wave) with a constant frequency is frequency-modulated (FM-modulated) or phase-modulated with digital data of "0" and "1".

Figure 1B:
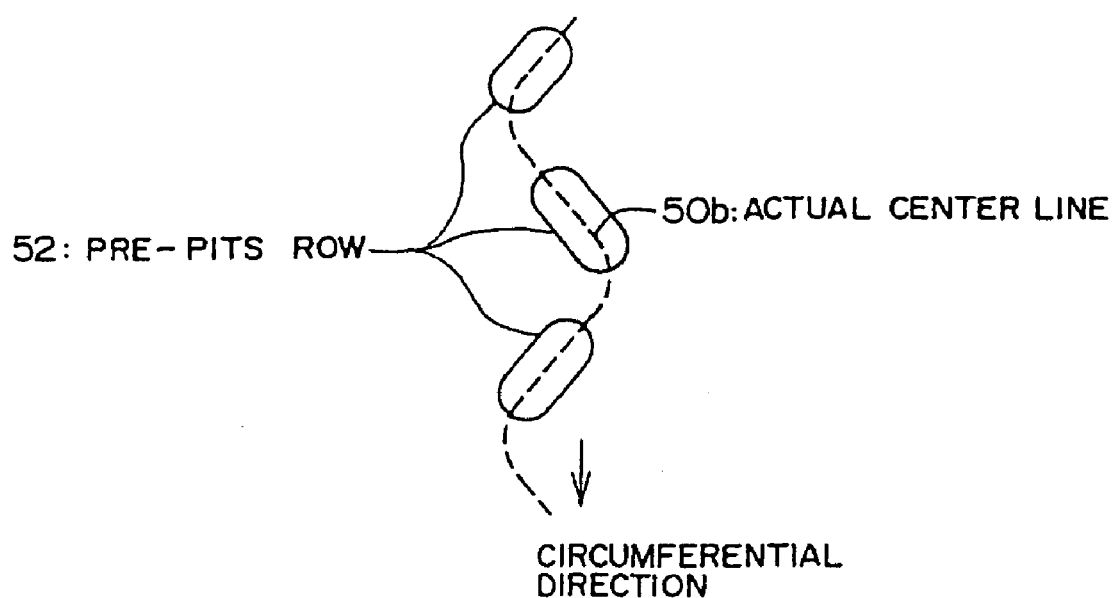
FIG. 1(b) is an illustrative view showing a guide groove in a read only area comprising a pre-pits row.

In the wobble equipped with address information, particularly, the address allocated along the guide groove by the wobble is also applicable to the concept of the guide groove in the wide sense, and when, as shown in FIG. 1(b), the actual center line 50b of a pit sequence (pre-pits row) 52 is wobbled at a frequency equal to that of the groove 50 of the RAM section, whichever of the master ROM, the post ROM and the RAM area, the addition of address becomes feasible with a wobble depending on a continuous carrier wave. Moreover, in addition to the address, another additional information can also be added.

Since it is desirable that the readout system can gain access and accomplish the readout without distinguishing between the ROM area and the RAM area, it is preferable that the ROM area and the RAM area have address information with consecutive serial numbers. This address information is given in the form of the above-mentioned wobble and also is included as a part of the recording data. In the case of being included as a part of the recording data, the address information having the same logical structure can be given as the data in the RAM area and the ROM area are made with the same format. In addition, in the case of utilizing the wobble in the wide sense as shown in FIG. 1(b), if the amplitude of the wobble 50 in the RAM area is almost equal to the amplitude of the wobble of the actual center line of a pre-pits row 52 in the master ROM area, the address information can continuously be read out over the entire area by means of one wobble readout circuit. In this case, the almost equality signifies the degree that the signal amplitudes almost equal to each other are obtainable in a wobble signal readout circuit, and usually, the magnitude of one amplitude is set to be less than twice the magnitude of the other amplitude.

In general, a push-pull signal readout circuit is used for the readout of the wobble, in both the cases shown in FIGS. 1(a) and (b), the readout circuit is applicable. Incidentally, the push-pull signal circuit is for detecting diffracted light reflected from a groove or dent-like pit through the use of a two-piece detector formed in a state divided into right and left sides with respect to the groove to calculate a difference therebetween, and is a technique well known by those skilled in the art.

As a matter of course, it is preferable that a ROM signal comprising a pre-pits row and a recorded signal in the RAM area on the phase change recording are decoded with the same logic circuit according to the same modulation mode. In addition, for the readout by the same readout unit, the recording signals in both the areas are required to have the substantially same reflectivity and modulation amplitude. For example, usually, in the case of a signal involving a dent-like pre-pit in a CD-ROM, because the reflectivity lowers at a pit position due to a phase difference of the reflected light, it is preferable that, even in the RAM area, the reflectivity is high in a non-recorded state while the reflectivity is low in a recorded state. In the phase change type recording layer, usually, a non-recorded state corresponds to a crystalline while a recorded state corresponds to an amorphous state. However, the reversal thereof is also acceptable, and it is also possible to associate different crystallines with each other.

In the present invention, likewise, the master ROM area has the same multilayer structure as that of the RAM area, and it is difficult that the readout system distinguishes between the ROM area and the RAM area. In addition, in not only the post ROM area but also the master ROM area, it is physically possible to overwrite data in the phase change type recording layer itself; therefore, for falsification prevention, erase and destruction prevention of ROM data, there is a need for at least the recording drive to recognize that it is the ROM area.

For this reason, it is preferable that identification information indicative of that it is a P-ROM is written in a specified area of the recording medium in order to make the recording system recognize a rewritable type medium (P-ROM) in which the phase change type recording medium partially has a read only area, and it is more preferable that the identification information is previously written on the substrate as the master ROM data such as pre-pits or wobbles.

Accordingly, the identification information representative of the rewritable type including a partial read only area is previously written on the substrate in the form of pre-pits or wobbles.

Furthermore, in the present invention, it is preferable that, regardless of whether in the ROM area or in the RAM area, file management information of the user data recorded in each area is written in the RAM area together. In this case, there is a need to prevent the file management information in the ROM area from being further lost in error due to the erasure or the overwriting of the file management information of the RAM data. For this reason, it is preferable that the address information for the access to the ROM area is also written (registered) previously as the master ROM area in the above-mentioned specified area.

Still furthermore, in the present invention, it is possible that a grouped ROM area or RAM area comprising consecutive addresses is considered as a variable-length data unit and a data attribution indicative of ROM or RAM is given at every variable-length data unit. In addition, for at least the ROM area, it is desirable that ROM area address information each composed of a variable-length data unit comprising the consecutive addresses, preferably together with the data attribution, are registered collectively in a specified area of the disc. As the address information to be registered, it is preferable to register not only a start address of each area but also a length (size) thereof or an end address together.

More preferably, disc identification information capable of identifying whether the disc is of a read only type having only a read only area, a rewritable type (P-ROM) having a partial read only area or a rewritable type having only a rewritable area is written in a specified area on the disc.

Thus, the data in the afor said read only area comprises a pre-pits row, and the address information in the read only area, together with the identification information, is previously written on the substrate in the form of pre-pits or wobbles, while the file management information on files included in the read only area and the rewritable area is written in the rewritable area.

With this arrangement, when a disc is inserted into the recording drive, it is possible to recognize that it is a P-ROM disc, and to acquire the file management information on the ROM area for saving it in a memory on the system. Such a means is effective in erasing only the file management information, and in preventing the disc from being initialized by overwriting in error to make difficult the access to the ROM area or the ROM data from being destroyed by the overwriting without recognizing the presence of the ROM area.

In this connection, if, in the read only area, particularly, in the master ROM area, its file management information such as a start address, size, end address or the like is written as master ROM data such as a pre-pit or wobble also in the file management area, it is possible to reduce a possibility of erasing in error by the aforesaid initialization. Not only in a case in which the file management area is placed into a non-recorded state but also when overwriting is made therein, the master ROM data can again be read out by returning to the non-recorded state.

On the other hand, it is also possible to erase the ROM data by overwriting data different from the ROM data in the phase change type recording layer of the read only area having the ROM data comprising a pre-pits row. In this case, for example, here a factory or software manufacturer side can certainly keep data, undesirable to show to the user side, in secret.

That is, with respect to a medium having both the master ROM area and a post ROM area, in a using method (which will be described later) of updating a part of application software data included in the master ROM area to re-record it in the post ROM area, for example, the factory or software manufacturer side can erase a part of data to be updated in the master ROM area(s) through the use of the above-mentioned erase method.

Thus, an erase method for read only data according to the present invention is an erase method of erasing read only data in an optical recording medium in which a phase change type recording layer is formed on a substrate and read only data is formed in the form of a plurality of pre-pits rows made in the substrate, wherein data different from the read only data is overwritten in the phase change type recording layer to make difficult the readout of the read only data.

In the present invention, in particular, it is preferable that predetermined data attribution is included in auxiliary data to be added to a basic data unit forming an address added minimum unit.

In one useful mode of an optical recording medium according to the present invention, data in a recording area is an EFM signal compatible with compact discs. Accordingly, although details of the present invention will be described hereinbelow using a format and terminology of CD and CD-RW, if the effect is the same, the invention is not limited to the CD format per se.

Incidentally, the general information about the CD format which will be described hereinbelow is disclosed in "CD Family", written by Heitaro Nakajima, Takao Ibashi and Hiroshi Ogawa, Ohmsha, "Compact Disc Book", written by Heitaro Nakajima and Hiroshi Ogawa, Ohmsha, "CD-R/RW Official Guide Book", written by Orange Forum, EXCEED PRESS CO., Japanese Laid-open (Kokai) No. HEI 11-250522, and other documents.

(A) DESCRIPTION OF EMBODIMENT OF THE INVENTION

As the logical data structure for CD, there are two types: a logical format prescribed by the rule of the Red Book and mainly suitable for music data and a format prescribed by the Yellow Book and suitable for data recording in general-purpose block unit forming the International Standard ISO9660. A principal description will be given hereinbelow of a format, called mode 1, of data recording CD-ROM formats. The difference in mode involves a structure of us r data, a difference of contents of error correction information to be added to the user data, or the like, which does not affect the essence of the present invention.

Figure 2:
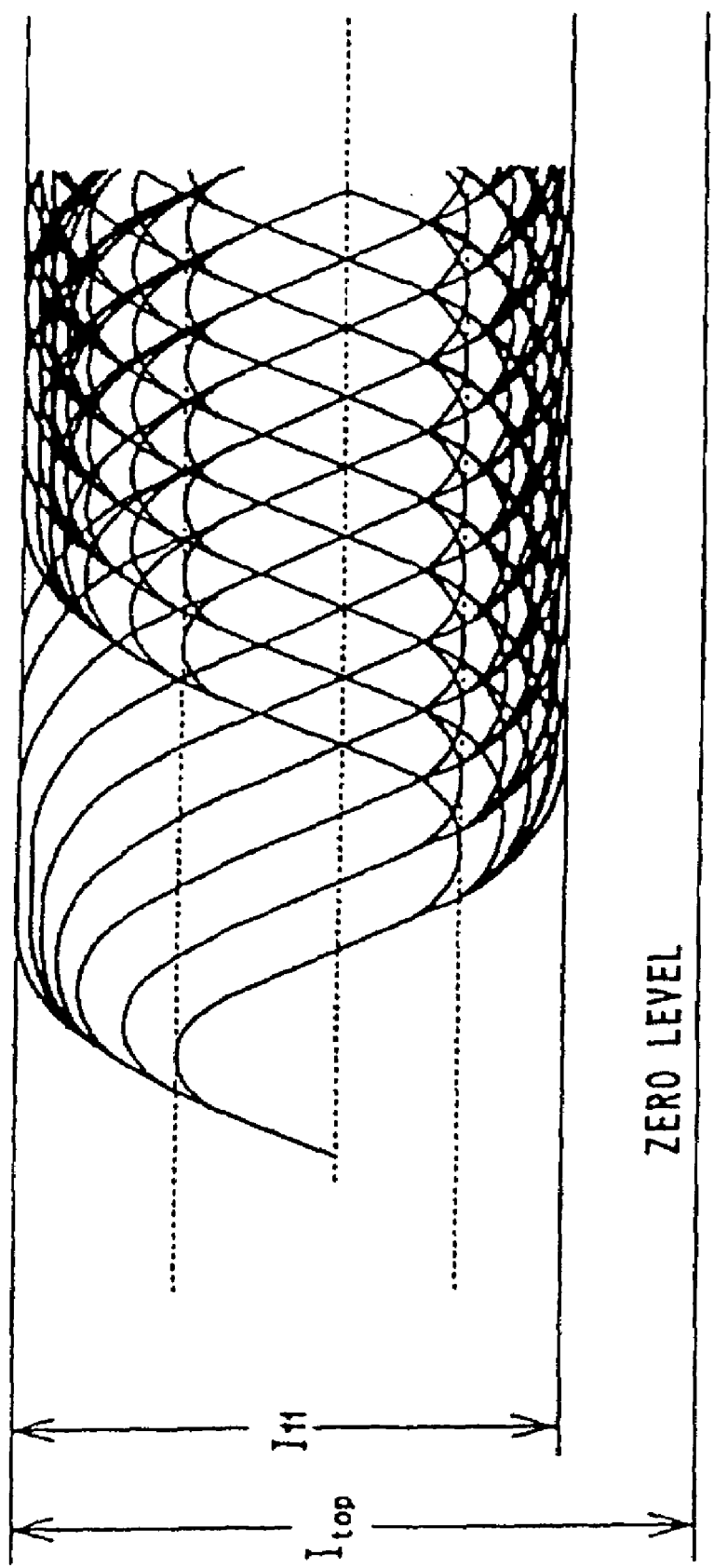
FIG. 2 is an illustration of waveforms of an analog signal of an EFM signal.

On the other hand, the CD-RW is prescribed in the Orange Book Part 3. The logical data structure recorded is basically according to the CD-ROM, and the readout is feasible through the use of a readout circuit for the CD-ROM. An EFM random signal recorded has readout signal waveforms shown in FIG. 2, and if it satisfies the requirements that the conversion of $I_{top}$ into a reflectivity shows 15% to 25%, the ratio $I_{11}/I_{top}$ of an amplitude $I_{11}$ of 11T mark and $I_{top}$ is 0.55 to 0.7, and the jitter of mark length and space length of each mark of 3T to 11T is below 35 nsec at a CD linear velocity of (1.2 to 1.4 m/s), it can be read out as a CD compatible signal with a drive for a rewritable type compact disc.

Figure 3A:
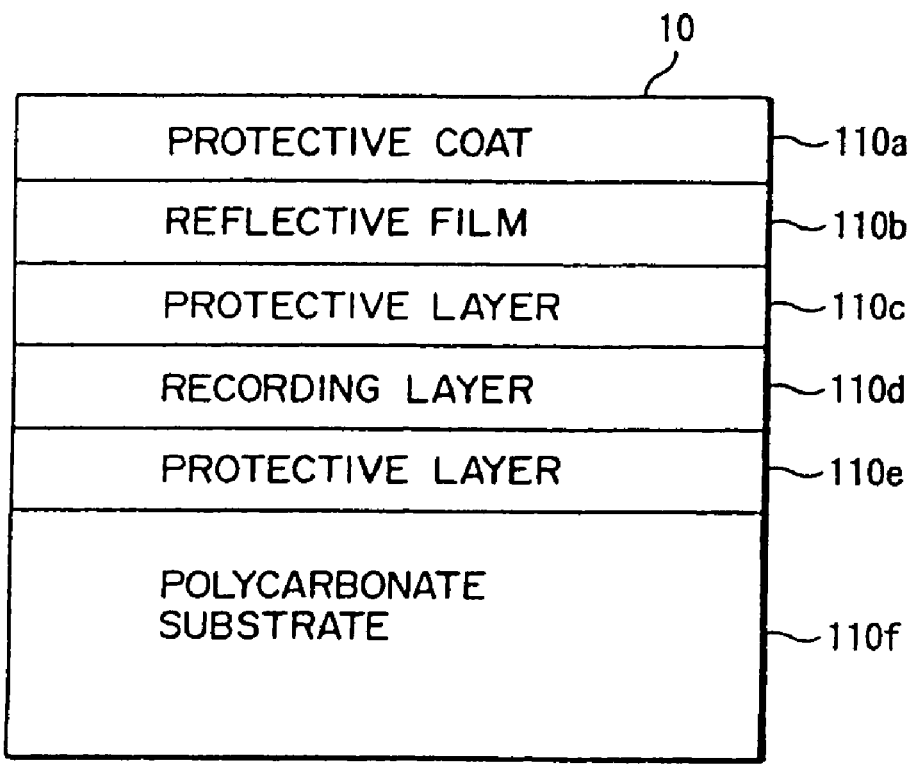
FIG. 3(a) is an illustrative view showing a multilayer structure of a CD-RW disc to which the present invention is applied.

FIG. 3(a) is an illustrative view showing a multilayer structure of a CD-RW disc 10 to which the prevent invention has application. The layer structure of the CD-RW disc shown in FIG. 3(a) is a multilayer structure, and is made up of a substrate (polycarbonate substrate) 110f in which a guide groove and/or dents 49 forming pre-pits can be made in its surface, protective layers 110e and 110c for controlling absorption of laser light in a phase change type r cording layer (recording layer) 110d and for adjusting the reflectivity by the multiple interference effective and further for controlling heat radiation from the recording layer to prevent heat deformation of the recording layer or the substrate, the recording layer 110d of a phase change type medium made to cover the substrate 110f and to permit the formation of an amorphous mark capable of generating a readout signal substantially corresponding to the dents 49 configuration made in the substrate 110f, and a reflective film 110b comprising a reflecting member placed on the opposite side to the recording/readout light incidence side of the recording layer in order to reflect laser light and to promote the radiation from the recording layer. In this connection, a protective coat 110a is for protecting a surface of an optical disc from being damaged. It is also appropriate that, instead of covering it along the surface configuration of the dent 49 as shown in FIG. 3(b) which will be described later, the protective coat 110a is formed to cover the surface in such a manner as to fill in the dent 49.

A focused laser beam for recording/readout arrives at the recording layer 110d after passing through the substrate 110f. In this case, the CD-RW recording/readout is conducted with an optical system having a wavelength of approximately 780 nm and a focusing lens numeric aperture NA of approximately 0.5.

Figure 3B:
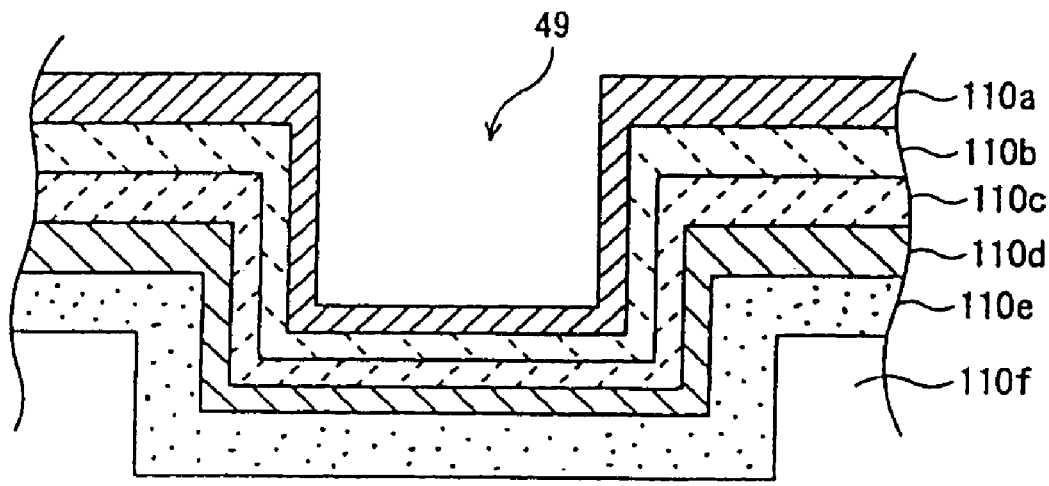
FIG. 3(b) is an illustrative view showing a dent section of a CD-RW disc.

FIG. 3(b) is an illustrative view showing a dent 49 of the CD-RW disc 10. In FIG. 3(b), the dent 49 is made to regenerate the configuration of the substrate layer 110f. In addition, in most cases, every layer is deposited by a sputter technique. Still additionally, irrespective of deposit methods, the same multilayer is taken for the recording area, which simplifies the manufacturing process and reduces the manufacturing cost.

Figures 4A, 4B:
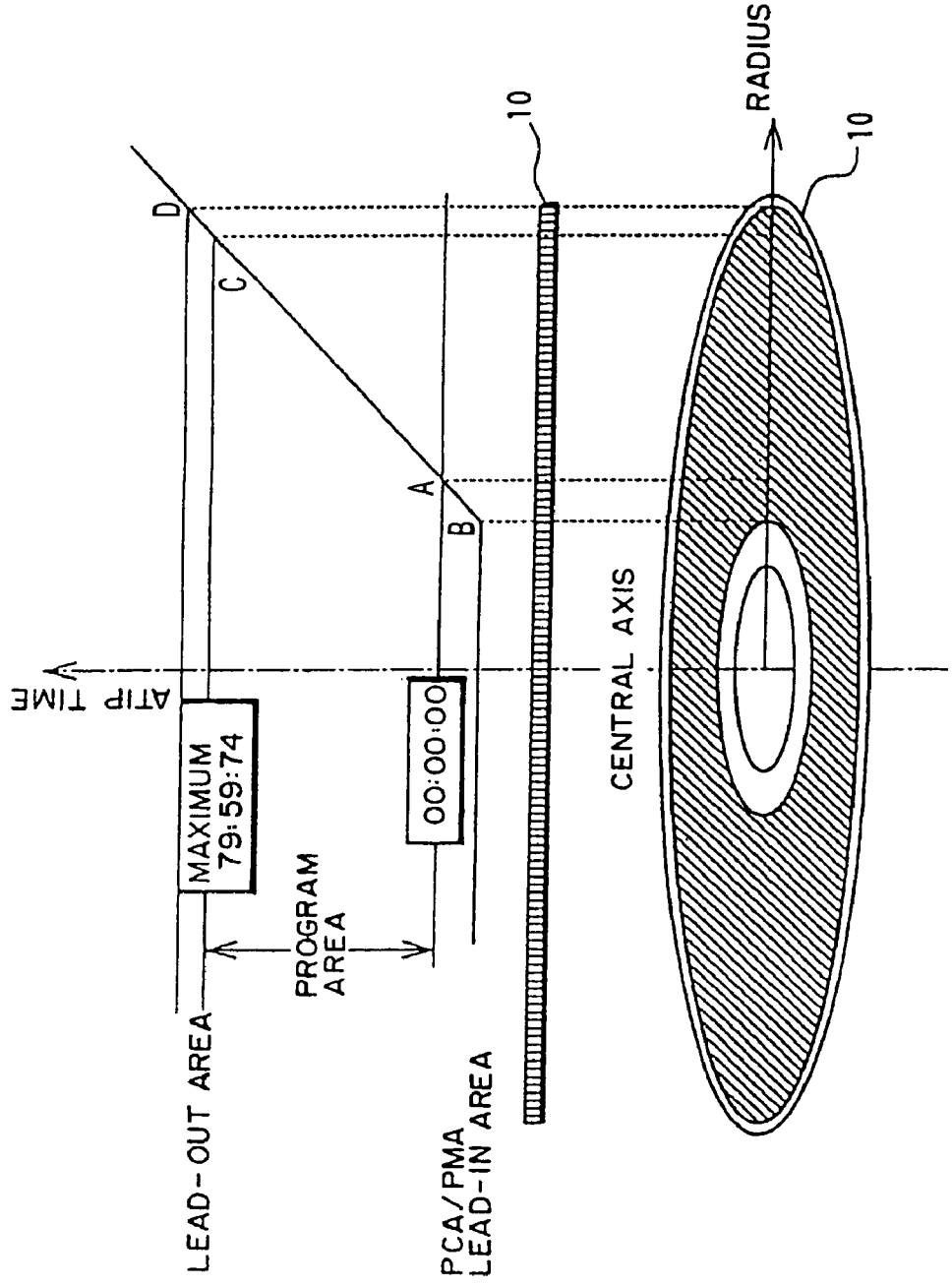
FIG. 4(a) is an illustration for explaining an area of a CD-RW disc to which the present invention has application.
FIG. 4(b) is a perspective view showing a CD-RW disc to which the present invention is applied.

FIG. 4(a) is an illustration for explaining an area of a CD-RW disc to which the present invention has application, and FIG. 4(b) is a perspective view showing a CD-RW disc to which the invention has application.

The CD-RW disc 10 shown in FIGS. 4(a) and 4(b) has a data structure comprising a PCA (Power Calibration Area), a PMA (Program Memory Area), a lead-in area, a program area and a lead-out area in the order from the innermost circumference. Of these, the PCA serves as a trial write area for determination of the optimum recording power, the PMA serves as a temporary file management information recording area peculiar to the CD-R or CD-RW, the lead-in area serves as an intended area for writing file management information or disc control information, called TOC (Table Of Contents), for use in a CD-ROM format, the lead-out area acts as an area for indicating the end of EFM data, and the program area acts as an area for recording user data. In the present invention, this program area has both a read only area and rewritable area. To maintain the readout compatibility with the conventional CD-ROMs, there is a need to record predetermined information in the lead-in and lead-out areas.

In the present invention, at least the area from the start point B of the PCA area to the end point D of the lead-out area (area indicated by oblique lines in FIG. 4(b)) is coated with the same phase change type medium. More concretely, it has a multilayer structure described with reference to FIG. 3(a).

Thus, this optical recording medium is composed of a readable read only area covered with a phase change type medium and has six layers, and an information rewritable area covered with the phase change type medium and having the same multilayer structure as the six layers. The rewritable area has a wobbling guide groove 50 formed to guide laser light as shown in FIG. 1(a).

As the areas for realizing a partial ROM function in the program area, there are two types: one is an area (master ROM area) in which data is recorded using a pre-pits row (row of pits formed in advance) comprising concave 49 made previously in the substrate 110f and the recording layer 110e is placed on the substrate 110f, and the other is an area (post ROM area) which, after data is recorded as a mark of the recording layer 110d, inhibits re-write in a partial area thereof by a recording drive unit.

In a case in which only a rewritable area exists and only a post ROM area exists as the ROM area, no pre-pit exists between the start point B of the PCA area and the end point D of the lead-out area, but only the guide groove 50 is present. On the other hand, in the case of the presence of the master area based on master ROM data, the pre-pits row 52 and the guide groove 50 exist, and in this case, it is preferable that the guide groove in a wide sense is continuously formed so that the center line 50b of th pre-pits row 52 has a wobble showing the almost same amplitude as that of the guide groove 50 as shown in FIG. 1(b).

In any case, since the address information is provided along the guide groove in the wide sense in the range from the start point B of the PCA area to the end point D of the lead-out area, it is preferable that address information expressed in terms of absolute time and a sync signal are added by the guide groove (ATIP information, absolute time in pregroove). The absolute time address is determined so that 1/75 is set as the minimum unit (frame), and is expressed in units of minutes, seconds and frames. In FIG. 4(a), the ATIP starts at 0 minute 0 second 0 frame (which will hereinafter be expressed in the form of "00:00:00") at the start point A of the program area, and continues up to 79:59:74 frame. In accordance with the data volume, the maximum ATIP address of the program area can vary. The program area shifts to the lead-out area at the C point in FIG. 4(a). The ATIP address of the lead-out area increases continuously following the final ATIP address of the program area. In general, the length of the lead-out area is approximately 1 to 2 minutes. On the other hand, the PCA, PAM and lead-in area are located between the B point and the A point in FIG. 4(a). The ATIP address thereof is reset to 00:00:00 at the A point, and then decreases sequentially from 99:59:74 in the direction from the A point to the B point (first address of the PCA). The ATIP address of the PCA, PMA and lead-in are limited to the order of 80 or 90 minutes.

In the present invention, in the CD format, it is preferable that, of three data hierarchies of an ATIP frame, an EFM frame and a block unit of approximately 2k bytes, a rewritable or read only attribution is prescribed in at least one hierarchy. This is because it is connected with the minimum unit capable of manipulating data in the CD-ROM system and the definition of the data attribution becomes possible at lower levels.

In addition, preferably, there are provided the attribution on whether it is rewritable, the attribution on whether it is non-rewritable (write-once or write-first-time) and the attribution on whether it is repeatedly rewritable. That is, in the best mode, for at least one of the above-mentioned three hierarchies, there are provided at least three types of attributions of write inhibit (read only), write-one (first time) (which functions as the post ROM area after recording) and rewrite (repeatedly rewritable).

In this case, the write inhibit (read only) attribution inhibits the overwrite on the master ROM or post ROM data and says handling as read only data. The write-once attribution, aside from recording at formatting which will be described later, achieves the write-once of the user data at an address, equipped with the aforesaid attribution, to realize a pseudo CD-R disc, and is effective to prevent the data falsification in the CD-RW disc.

Still additionally, the type of attribution is not limited to these three types, but is also possible to set a conditional readout or a conditional rewrite according to applications. In this case, the conditional readout signifies, for example, data which can be read out only when a predetermined cipher or the like is inputted. Likewise, the conditional rewrite signifies, for example, that recording is allowed only in the case of input of a predetermined cipher.

Meanwhile, for the CD-RW, as methods of adding address data, there are three hierarchies. This is related to the basic data unit prescribing a group of data in a CD format. That is, since address is added according to basic unit of data, it is natural that the data attribution information is also added according to basic unit of address data, and it is preferable to make use of the redundancy of the address information data bit.

As the address-added hierarchies, there are three hierarchies:

(1) an ATIP frame depending on a wobble;

(2) In an EFM signal, a subcode added to user data (for each 98EFM frame); and (3) a header of a block with a length of approximately 2kB in a CD-ROM format.

All of these correspond to 1 frame 1/75 seconds, forming a minimum unit of ATIP and are synchronized with an ATIP address forming an address basically fixed physically to a disc and, further, are described in terms of in the same units of minute, second and frame. When viewed from the user data, it is partitioned into block units (2352 bytes) of the CD-ROM format, and in the course of the EFM, a subcode is added thereto so that an EFM signal is recorded at a predetermined ATIP address with this address corresponding in position to the ATIP address.

First, in the following (A1), (A2) and (A3), a detailed description will be given of data attribution adding methods in three hierarchies of the above-mentioned wobble ATIP signal, EFM signal subcode and CD-ROM format block structure. The following description will be given by the use of formats and terminology for CD and CD-RW.

(A1) Method Using ATIP Frame on Wobble

This method is a method taken on the lowest-order hierarchy, and is for prescribing a read only area or a write-once area through the use of a configuration made previously on a substrate, concretely, it utilizes ATIP information written in a wobble.

The ATIP information takes 1/75 second as the minimum unit (frame) of an address and assumes 22.05 kHz as a spatial frequency of a wobble, with one frame including a wobble of 294 periods. In addition, one frame includes information of 42 bits and, therefore, every seven periods correspond to one bit. That is, frequency-modulation (FM) of ±1 kHz is made at every seven periods according to whether the data is "0" or "1". A sync bit for decoding the data, together with absolute time information and error correction information accompanied therewith, is included in the 42 bits of the ATIP information.

Figure 5:
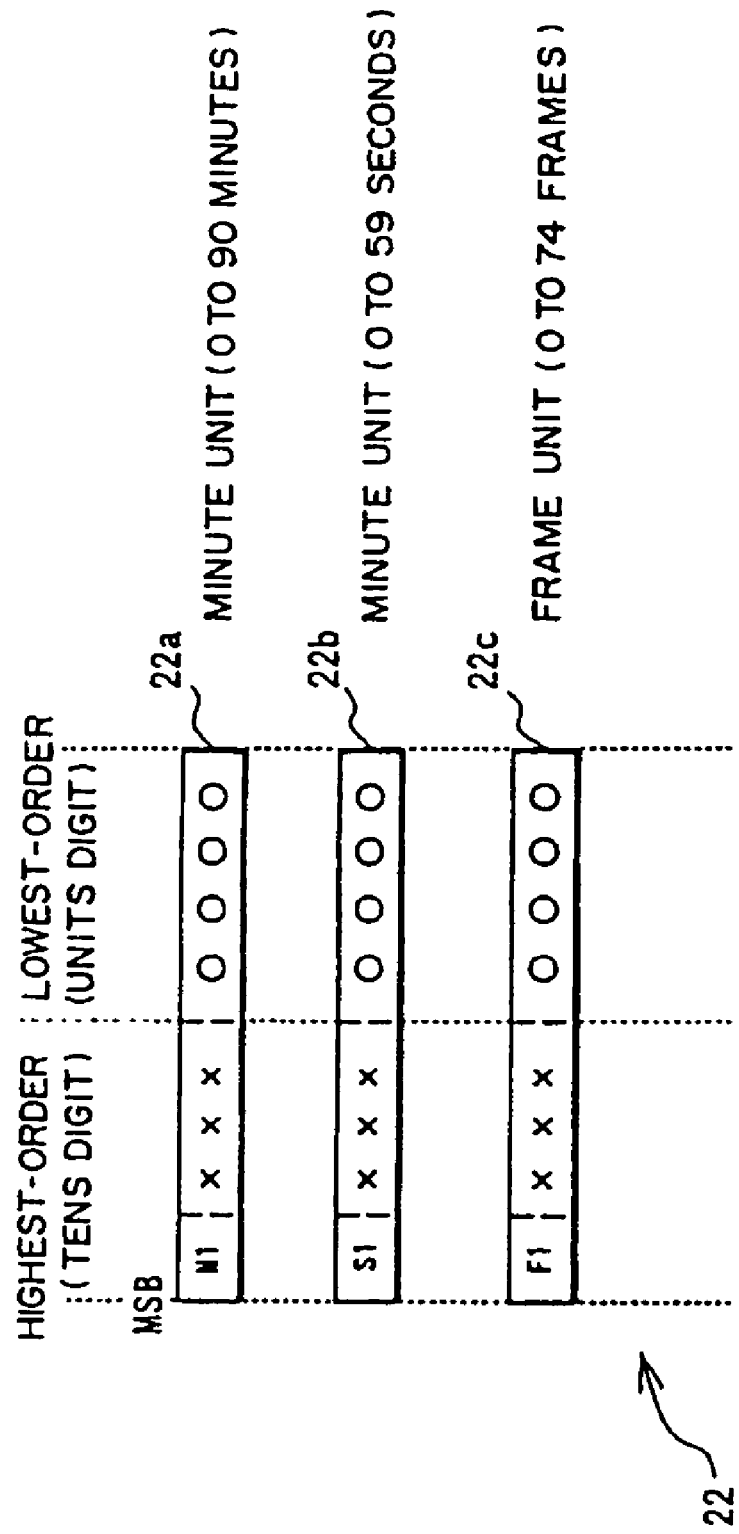
FIG. 5 is an illustration of a data structure in ATIP.

FIG. 5 is an illustration of an ATIP data structure. In FIG. 5, each of three types of bytes 22a, 22b and 22c is produced by decoding a wobble frequency-modulated. The byte 22a represents minute information, the byte 22b denotes second information, and the byte 22c signifies frame information. In addition, the unit of each of the minute, second and frame (1/75 second) is expressed in terms of two-digits BCD (Binary Coded Decimal) and, hence, the ATIP information is represented with four bits for each place, i.e., eight bits (one byte) in total. Still additionally, (M1, S1, F1) forming the most significant bits of the respective bytes 22a, 22b and 22c are put to use.

A description will be given hereinbelow of a mode utilizing the (M1, S1, F1).

In th prescription for compact discs, the value of ATIP information in a program area is from 00 minute 00 second 00 frame to, at most, 79 minute 59 second 74 frame, so data equivalent to the order of 80 or 90 minutes in BCD does not appear in the intended program area. That is, in FIG. 5, "1" does not appear at any bit of M1, S1 and F1 forming the MSB (Most Significant Bit) of each unit. In the lead-in area of the CD-RW disc, when "1"appears in S1 to F1, special information such as disc recording condition is written positively through the use of a lower bits.

In particular, when "1" appears at the M1 bit forming the MSB of the minute unit, although it can be mistaken for the lead-in, PCA, PMA or lead-out area because of data exceeding 80 or 90 minutes, in the recent years, in most cases, the program area has been allocated to near 79 minute 59 second 74 frame and data exceeding 80 has been assigned to the lead-out, and hence the ATIP address of the lead-out area has not particularly been distinguished from the ATIP address of the data area. On the other hand, commonly, the address exceeding 80 minutes has been allocated to the PCA, PMA and the lead-in area. That is, only in the case of M1=1, a decision can be made to an address other than the program area and the lead-out area. In addition, since a start address of the lead-out is written in terms of absolute time in a part of file management information stated in the lead-in area, it is possible to distinguish between the program area and the lead-out area on the basis of this information.

Meanwhile, in the program area, it is obvious that (M1, S1, F1)=(0, 0, 0) only. This is because, since the second unit takes up to 59 seconds, "1000" and "1001" corresponding to "8" and "9" of ten digits of the BCD do not appear, and since the frame unit takes up to 74 frames, likewise, "1000" and "1001" corresponding to "8" and "9" of ten digits of the BCD do not appear. In a narrow sense, only in the case of (M1, S1, F1)=(0, 0, 0), it can be considered as the program area.

Thus, in the program area, it is possible that a combination (M1, S1, F1)=(0, 0, 1), (0, 1, 0), (0, 1, 1) of M1, S1 and F1 bits is used as attribution information of the corresponding ATIP frame and the absolute time of the ATIP frame is written by a lower digit bit.

So far, the combination (M1, S1, F1)=(0, 0, 1), (0, 1, 0), (0, 1, 1) has been allocated to special information present in only the lead-in area. That is, if the ATIP information starting at M1=0 exists in the lead-in area which takes only M1=1 as the absolute time, interpretation is made such that special information (recommendation recording condition or the like) but the absolute time is written at the remaining bits.

The present invention proposes that, in the program area, special (M1, S1, F1) combination, which has not been defined so far, is allocated to attribution information of an ATIP frame, which provides a satisfactory manner usable without significantly impairing the compatibility with the conventional devices.

First of all, a decision on a program area is made on the basis of M1=1 and lead-out start time information written in the lead-in area, and if MSB=(M1, S1, F1)=(0, 0, 0), a decision is made that data corresponding to the ATIP frame thereof is the conventional rewritable data. If (0, 0, 1), (0, 1, 0), (0, 1, 1), the definition of the ATIP frame attribution becomes possible. Since, irrespective of M1, S1 and F1 of MSB, an arbitrary ATIP address from 00:00:00 to 79:59:74 is expressible with the lower three bits of ten digits of the BCD and four bits of one digit thereof, no problem arises in adding address.

In the present invention, aside from association with (M1, S1, F1)=(0, 0, 1), (0, 1, 0), (0, 1, 1), there are allocated at least three types of attributions: inhibit of write (read only) based on pre-pits, write-once (first-time writable) (which functions as a post ROM area after the recording) and rewrite (repeatedly rewritable).

Incidentally, in order to add the above-mentioned ATIP information to pre-pits, the center line 50b of the pre-pits row 52 may be wobbled to show the same amplitude as that of the rewritable area as shown in FIG. 1(b). From a push-pull signal by pre-pits, it is possible to read out a wobble signal and ATIP information easily just like a wobble signal based on a wobble, and there is no need to use a special circuit.

Figure 6:
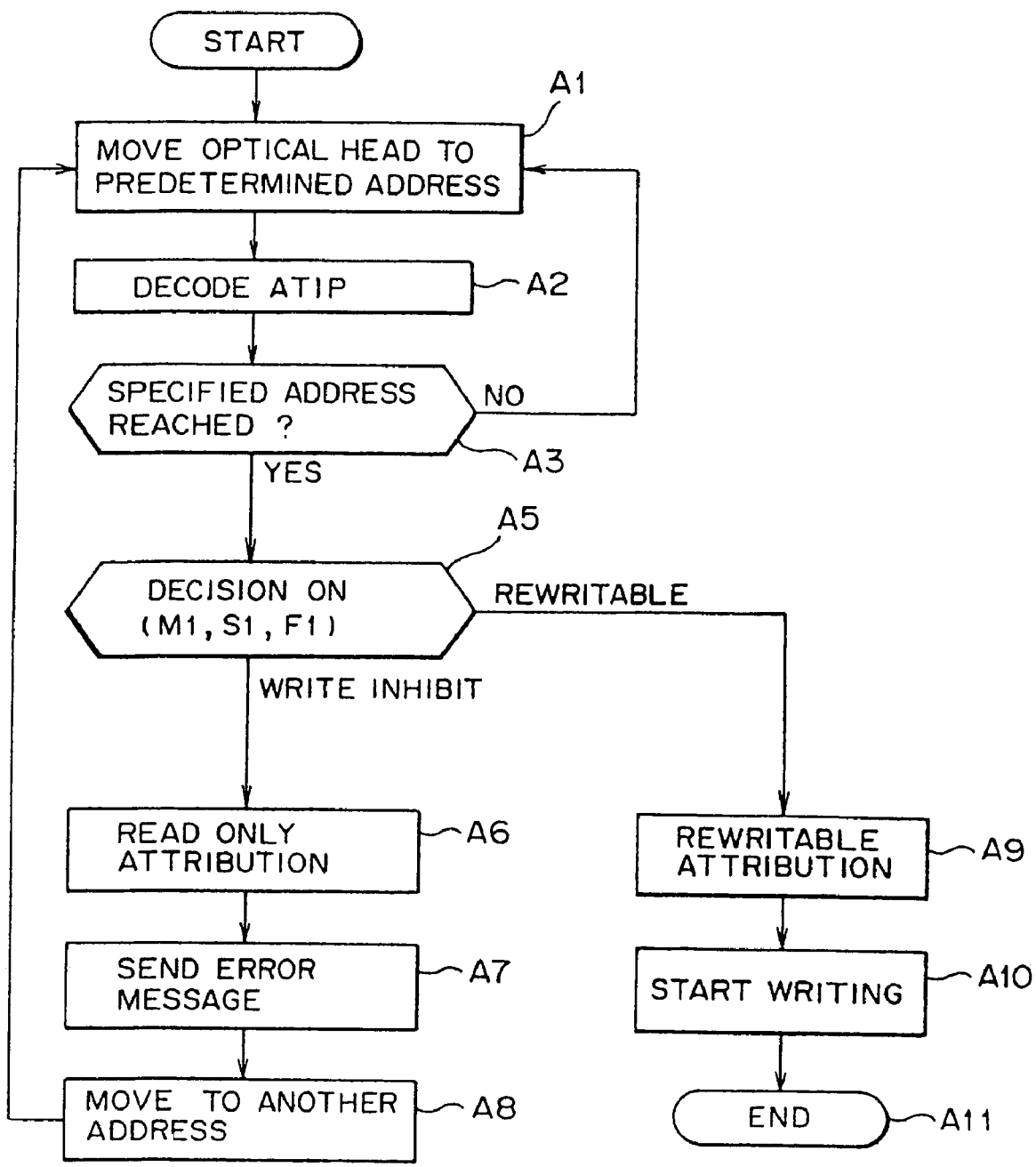
FIG. 6 is a flow chart showing file write utilizing ATIP.

FIG. 6 is a flow chart showing file write utilizing the ATIP. First, an optical head is shifted to a predetermined address (step A1) to decode the ATIP (step A2). Subsequently, at a step A3, a decision is made as to whether or not it arrives at a specified address. If the decision shows no arrival at the specified address, a NO route is taken to repeat the processing from the step A1. On the other hand, in the case of the arrival at the specified address, an YES route is taken, and at a step A5, a decision is made on (M1, S1, F1).

In addition, a step A5 is implemented to make a decision as to an attribution of the ATIP frame on the basis of (M1, S1, F1). At this time, if the attribution is th write inhibit, a write inhibit route is selected, and at a step A6, a decision is made to the read only attribution, and at a step A7, an error message is sent out, then followed by a step A8 where the optical head is shifted to another address, thus repeating the processing from the step A1.

Furthermore, at the step A5, in the case of the "rewritable", a "rewritable" route is selected, and a step A9, a decision is made to the rewritable attribution and at a step A10, the writing starts, then followed by a step A11 where the write routine comes to an end.

In this connection, in the flow chart of FIG. 6, although, after the step A7 for sending out the error message, the step A9 is placed to move the optical head to another address, it is also possible that the operation terminates at the step A7 of sending out the error message.

As described above, since the write inhibit attribution is recorded in an ATIP signal, when having access to a predetermined address, the recording drive unit always decodes the ATIP address, and when detecting the above-mentioned MSB combination, it immediately conducts the processing such as to stop the power of recording laser light for shifting to an abnormality processing routine. In addition, when the recording drive unit has access to a ROM area with a write inhibit attribution, an error message occurs at the write. Therefore, even if the recording drive unit designates an address in the inhibit area in error, the destruction of the ROM data due to the mistaken writing is preventable.

Even if the attribution of the ATIP frame in the program area is any one of the attributions prescribed above, when the absolute time information as usual is recorded in the form of subcode in the corresponding EFM signal, the above-mentioned irregular Ml-bit using method does not reflect on the EFM signal readout system. That is, the program area is set as M1=0 and the BCD data is produced according to only absolute time information so that it is set as the absolute time information included in a subcode of an EFM signal.

In this case, in general, the readout system side including the CD-ROM drive acquires address information from only the subcode recorded with an EFM signal, which eliminates the influence of the allocation of the aforesaid irregular ATIP information from the readout system. In addition, this does not affect the readout by the existing CD-ROM drive. Although there is a need to alter the firmware (internal program for drive control) only on the recording system side, this alteration is achievable simply by rewriting the program as the version-up of the device driver on the recording unit side, and the alteration of the hardware in the recording drive is unnecessary, so it is a preferable one.

Thus, in a P-ROM using a phase change type medium, logical seamless file management of a ROM area and RAM area mixed becomes feasible through the use of bit values of (M1, S1, F1).

In addition, since the access becomes possible with the same circuit in this way, it is possible to efficiently realize both the data distribution function and user data recording function, thus promoting the utilization of a CD-RW disc.

A master ROM area is producible by a pre-pits row to which the write inhibit (read only) attribution is added with the ATIP, thus ensuring the write inhibit processing. On the other hand, if the write inhibit (read only) attribution is given to a part of a non-recorded rewritable area in the case of the ATIP and data is recorded and edited by only a factory or software manufacturer through the use of a special recording drive unit which can ignore the write inhibit processing, the recording drive unit for general users can create a post ROM area functioning as ROM data. In addition, the rewritable attribution is given to only the remaining rewritable area so that it is maintained in a state usable as a RAM area on the user side.

Since the attribution based on the ATIP is given to a wide-sense wobble formed previously on a substrate, the rewrite of the attribution itself becomes impossible, thus providing a highest-reliability ROM data falsification preventing method.

Thus, three types of data areas: a master ROM, a post ROM and a RAM, can be mixed on the same disc.

In addition, the rewritable area to which the write-once (first-time writable) attribution is added according to the ATIP is usable as a pseudo write-one medium on the user side and a master ROM area is producible on the user side.

Figure 7:
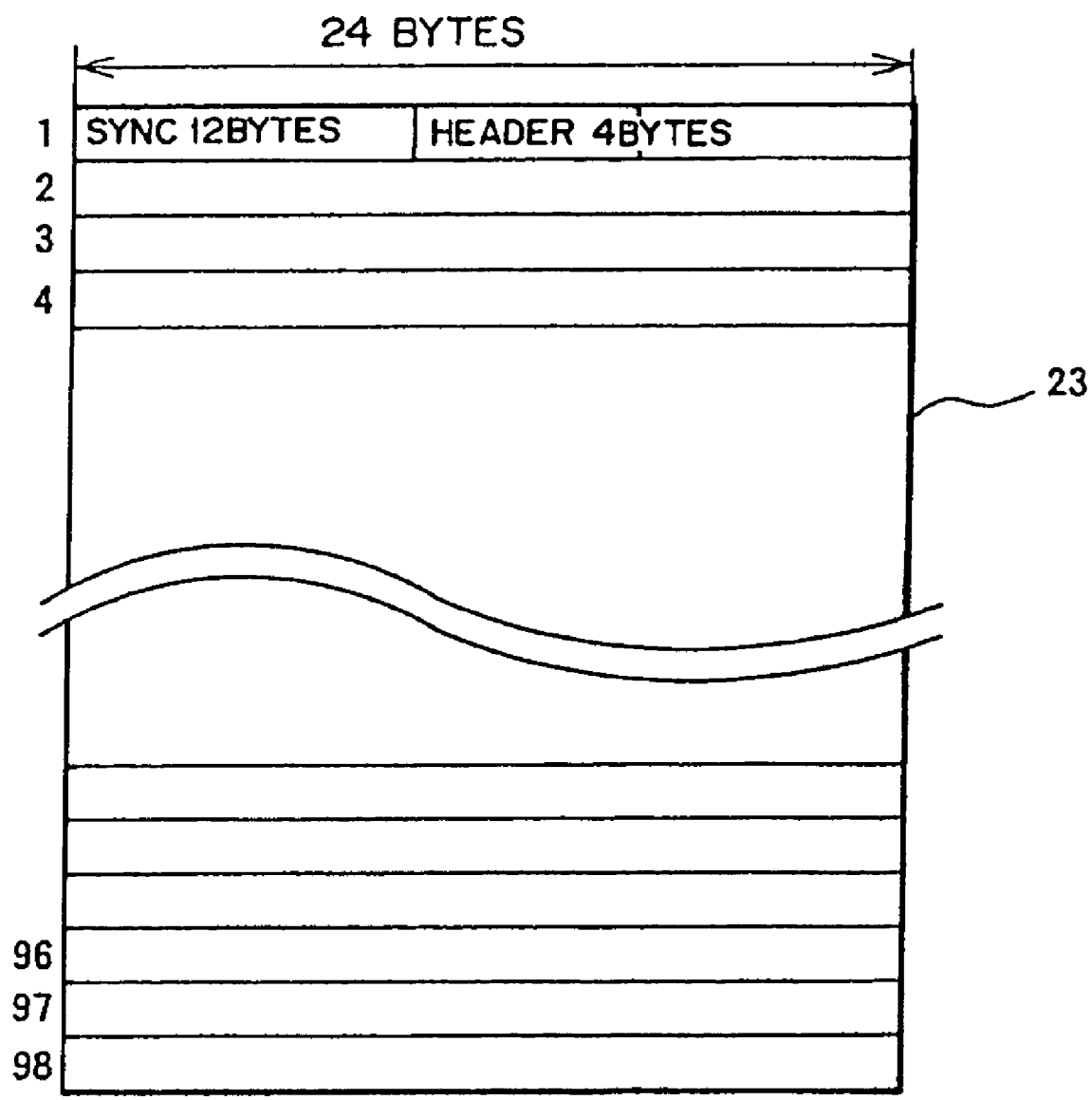
FIG. 7 is an illustration of a block in which 98 frames are arranged.

(A2) Method of Using Subcode (for Each 98EFM Frame) Added to User Data in EFM Signal FIG. 7 is an illustration of a block comprising 98 frames (sectors) arranged. In FIG. 7, a block 23 has a sync signal (12 bytes) indicative of a block head and a header (4 bytes) including writable/non-writable information on addresses or the like. In addition, the recording drive unit is designed to add auxiliary data (288 bytes) for error correction to the original data on user data and, after these data are scrambled, divides into 24 bytes×98 lines for adding error correction parity bit, a subcode and others to each line, thereby performing the EFM modulation. Each of these lines is referred to as a "EFM frame".

In the case of an audio format (CD-DA) prescribed in the Red Book, a frame unit (1/75-second length) forming a minimum unit of the ATIP includes user data of 2352-bytes length. The user data of the 2352-bytes length is called a main channel, and is divided into a 24-bytes for one line× 98-lines matrix. When each line is divided in units of 12 bytes, it becomes data corresponding to the right and left channels of stereo music data. After an additional bit for error correction is further added to each line, an 8-bit data called a subcode is added. That is, through the use of 8-bit×98 auxiliary data, addresses and data attribution information are added to a block made in units of 2352 bytes. The header information of the aforesaid block is data-processed at an IC level of a lower level, in addition to the CD-ROM drive, a music CD drive can also give a recognizable data attribution.

A 98-line matrix is established in a state where eight bits of the subcode is set as one line, and a data string of 98 bits (12 bytes) set by grouping each string is referred to as a "channel", and named P, Q, R, S, T, U, V or W channel. In particular, one of these is referred to as a "Q channel", and the address information is described in 98 bits of the Q channel.

Since the subcode includes 8×98 bits, many non-used bits exist, so new data attributions can be added using the non-used bits. A description will be given hereinbelow of an example in which the control bit is used utilizing the Q channel.

Figure 8:
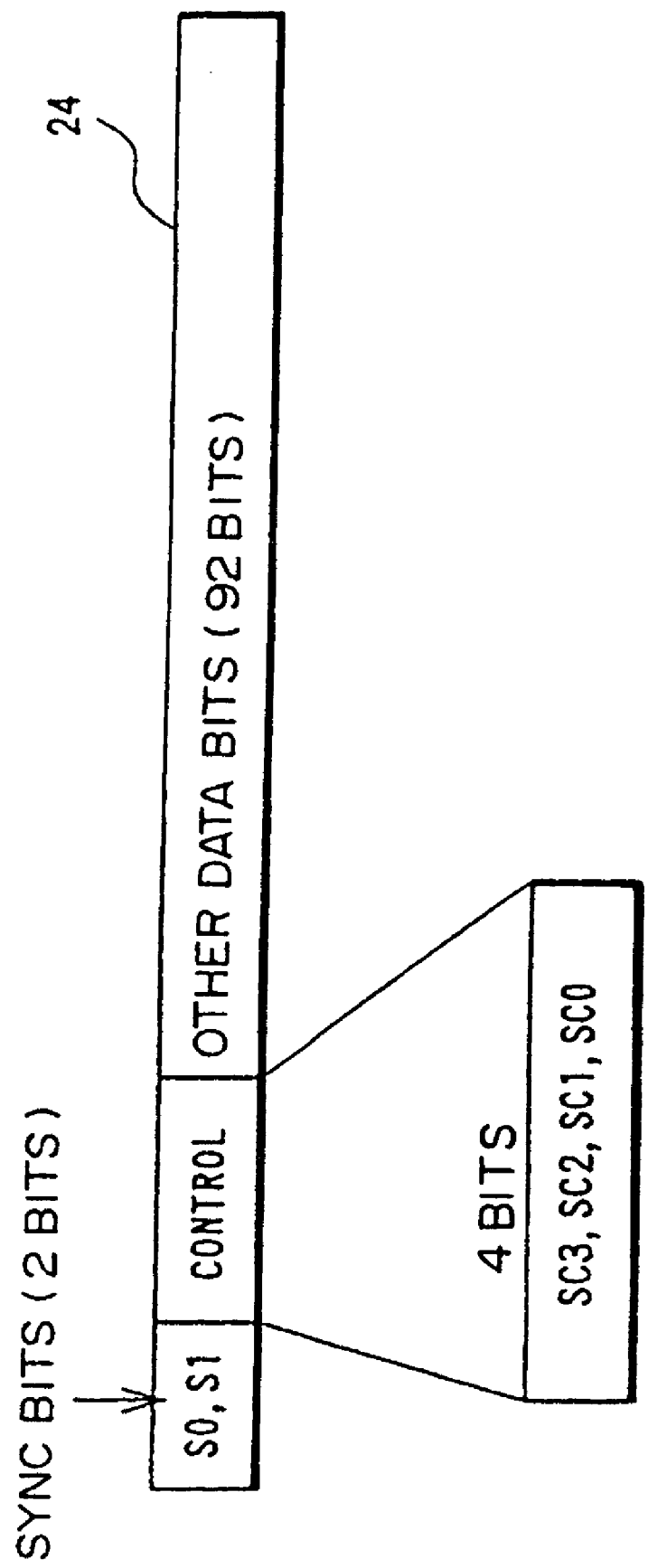
FIG. 8 is an illustration of a Q-channel data structure.

FIG. 8 is an illustration of a data structure of the Q channel. In FIG. 8, Q channel data 24 includes sync bits (S0, S1), a control bit (CONTROL), and other data bits. The control bit (CONTROL) is representative of a write attribution, and is composed of (SC3, SC2, SC1, SC0) in the order of rank lowering.

More concretely, the four bits (SC3, SC2, SC1, SC0) of the CONTROL field of the subcode Q channel shown in FIG. 8 are used as follows. That is, according to the contents disclosed in Japanese Laid-Open (Kokai) No. HEI 11-250522, the four bits of the CONTROL bit are specified as shown in the Table 1 in the Red Book/Yellow Book. In the Table 1, mark x represents that any one of "0" and "1" is acceptable, and the prescription on the item numbers 1 to 6 has already been used in the current standards.

TABLE 1

Allocation of CONTROL Bit

| Item No | SC3, SC2, SC1, SC0 | Description of Data Attribution Specified |
|---|---|---|
| 1 | 0, 0, x, 0 | two audio channels with no pre-emphasis |
| 2 | 0, 0, x, 1 | two audio channel with pre-emphasis |
| 3 | 0, 1, x, 0 | data track recorded in Track at Once |
| 4 | 0, 1, x, 1 | data track recorded in recordable mode |
| 5 | x, x, 0, 1 | digital copy inhibit |

TABLE 1-continued

Allocation of CONTROL Bit

| Item No | SC3, SC2, SC1, SC0 | Description of Data Attribution Specified |
|---|---|---|
| 6 | x, x, 1, x, | digital copy permission |
| 7 | 1, 0, x, 0 | non-defined |
| 8 | 1, 0, x, 1 | non-defined |
| 9 | 1, 1, x, 0 | non-defined |
| 10 | 1, 1, x, 1 | non-defined |

In this Table, each of the item numbers 1 and 2 relates to the attribution of an audio signal. In addition, as found from the item numbers 5 and 6, irrespective of other attributions of data, the SC1 bit is allocated to the specification of digital copy inhibition/permission, and cannot be put to use.

In consequence, at present, spare (non-defined) is set up in a case in which SC2 to SC0 assume "0" or "1" only when SC=1 in such cases as the items 7, 8, 9 and 10, and the data track write inhibit (read only) attributions are defined utilizing these combinations.

That is, in this method, when SC3=1, it is considered as a data track of a CD-ROM format, and only in this case, the write inhibit (read only) attribution can be defined a combination of SC2 and SC0.

Therefore, when SC3=1, possible combinations (0, 0), (0, 1), (1, 0) and (1, 1) of (SC2, SC0) are allocated to at least three types of attributions: the write inhibit (read only), write-once (first-time writable) (which functions as a post ROM area after the recording), and rewrite (repeatedly rewritable). In addition, with respect to which of the attributions is one of the (SC2, SC0) combinations, free selection is possible. Still additionally, it is also possible that three of (0, 0), (0, 1), (1, 0) and (1, 1) are allocated to the attributions and the remaining one is given to, for example, a conditional readout or writable attribution.

With respect to the subcode, including the other channels, all non-used bit assigns can be an object of the allocation of data attributions, but the channels R to W are employed for a maximum of 64 application prescriptions (CD-G, CD-TEXT, and others); for this reason, it is preferable to use a method utilizing a block attribution limited to the ATIP described in (A1) or to a CD-ROM format to be described in (A3).

Figure 9:
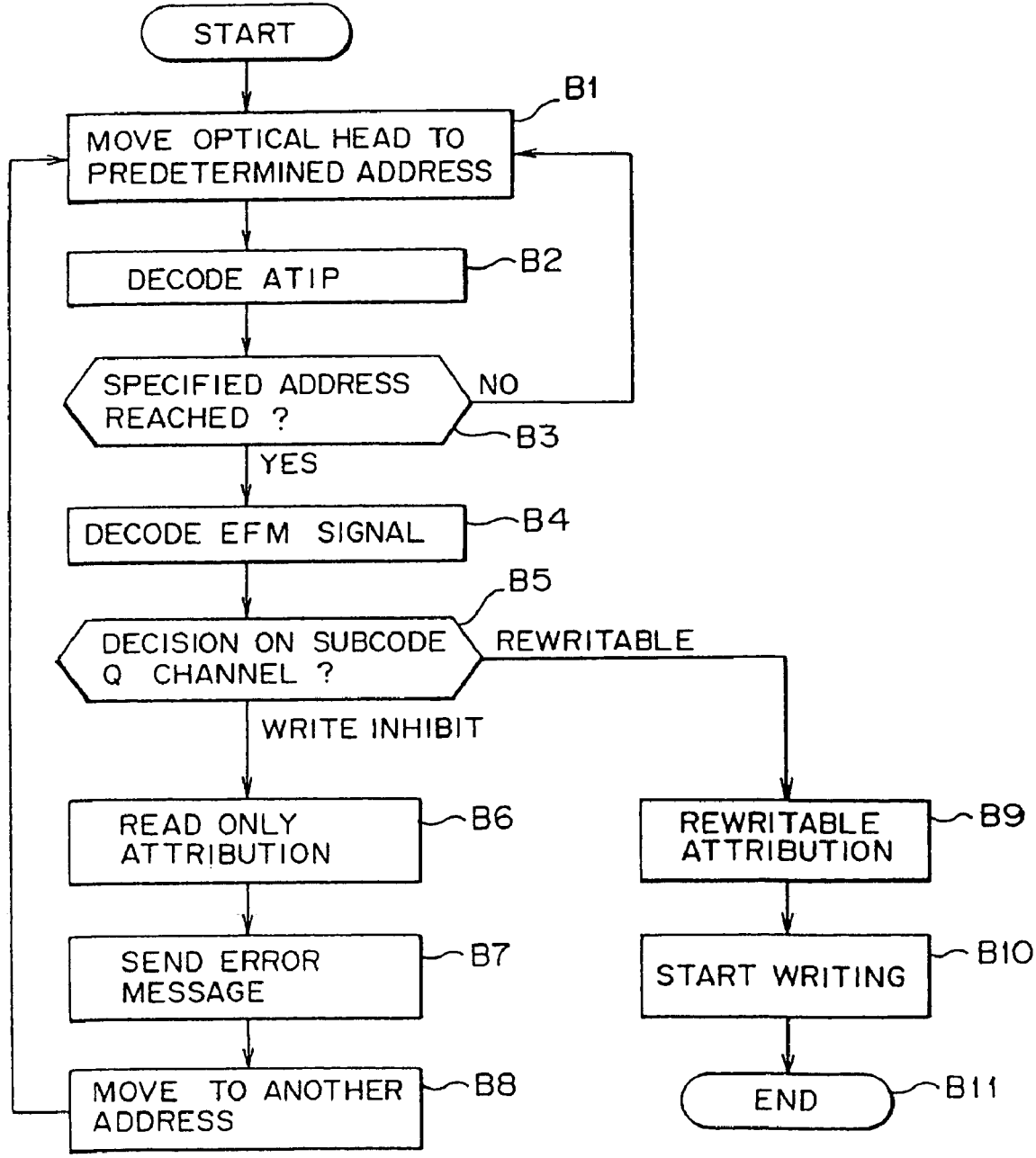
FIG. 9 is a flow chart showing file write utilizing an EFM signal.

FIG. 9 is a flow chart showing file write utilizing an EFM signal.

First of all, an optical head is shifted to a predetermined address (step B1) to perform ATIP decoding (step B2). Subsequently, at a step B3, a decision is made as to whether or not it arrives at a specified address. If the specified address is not reached, a NO route is taken to repeatedly conduct the processing from the step B1. On the other hand, for the arrival at the specified address, an YES rout is taken to decode the EFM signal at a step B4.

Following this, at a step B5, a decision on attribution is made on the basis of the data of the Q channel decoded. If the decision attribution is the write inhibit attribution, a write inhibit route is selected to make a decision to the read only attribution at a step B6 and send out an error message at a step B7, then followed by a step B8 to shift the optical head to another address, thereafter repeatedly conducting the processing from the step B1.

In addition, if the step B5 shows the rewritable attribution, the "rewritable" route is selected to make a decision to the rewritable attribution at a step B9 and start the writing at a step B10, then followed by a step B11 to terminate the write routine.

Incidentally, in the above-mentioned flow chart of FIG. 9, although the step B8 for shifting the optical head to another address is placed after the step B7 for sending out the error message, it is also possible to terminate the routine at the step B7 to send an error message.

Thus, since data processing is conducted at the IC level of a lower level unlike header information of a block which will be described later, in addition to the CD-ROM drive, a music CD drive can also give a recognizable data attribution.

In addition, in this way, since the recording drive unit side can cope with it only by rewriting the program through the version-up of a device driver incorporated into a firmware, it is possible to eliminate the need for the alteration of the hardware of the recording drive unit and further to handle it in an existing unit used condition. Incidentally, also on the readout side, in a case in which an error takes place for that another bit is put in a (SC2, SC0) bit in which (0, 0) data has usually been placed in a non-defined state so far, there may be a need to rewrite the firmware.

Still additionally, logical seamless file management can be implemented through the use of the control bit (SC2, SC0) of the Q channel, so a ROM area and a RAM area can be placed in a mixed state on the same phase change type medium.

Moreover, in this way, since the access is made through the use of the same readout circuit, it is possible to efficiently realize a data distribution function and a user data recording function, which promotes the use of the CD-RW disc.

Still moreover, after predetermined data editing recording is made in a part of the rewritable area on the factory or software manufacturer side, the data is defined as the write inhibit (read only) using a subcode attached thereto, the actual master ROM area is producible. If the data write inhibit attribution in the rewritable is set so that an alteration thereof is inhibited on the user side, it is possible to prevent it from being falsified against the intention of the post ROM data manufacturer.

Naturally, for the master ROM area comprising a pre-pits row, the write inhibit (read only) attribution is given to the subcode in producing pre-pits row data. In addition, the rewritable attribution is given to only the remaining rewritable area so that it is usable as a RAM area on the user side.

Thus, three data areas of master ROM, post ROM and RAM can be placed in a mixed state on the same disc.

(A3) Method of Using Header of Block with Length of Approximately 2 kB in CD-ROM Format In this embodiment, data attributions such as read only and write inhibit are given in units of blocks prescribed in a CD-ROM format. As stated above, in the CD-ROM format, user data is partitioned according to 2048 bytes, and auxiliary data is added to this 2048-byte data to produce data equivalent to one block (2352 bytes).

That is, a block 23 (see FIG. 7) is composed of a sync signal (12 bytes) indicative of the head of a block and a header (4 bytes) including "writable"/"non-writable" information such as addresses, and auxiliary data (288 bytes) for error correction is further added thereto. These data except the sync signal are scrambled. In addition, the data comprising the sync signal and the scrambled data is divided into 24 bytes×98 lines, and parity bits for error correction, a subcode described in (A2) and others are added to each line, and modulated in EFM.

In addition, each block has a header, and auxiliary data indicative of an address of each block, data attribution and others is added to each header. This header data comprises four bytes, and through three of these bytes, the address of each block is recorded with 24 bits in units of minute, second and frame identical to those in the ATIP (see FIG. 5).

Still additionally, through the use of the remaining one byte (8 bits), attribution data indicative of a mode of each block is added to each header. In the Orange Book Part 3, an attribution of the block is prescribed in order to use the packet recording which will be described later, and is recorded with specified three bits. Moreover, specific information prescribed in the Yellow Book is added with different two bits. The remaining three bits are free bits which are not prescribed particularly.

That is, with respect to these three free bits, there are provided at least three types of attributions: the writable attribution, the write inhibit (read only) attribution and the write-once (first-time writable) attribution on that block. In addition, when provided, three types of states are simply given, only two bits will work in fact, and free selection of one of the three bits becomes possible.

For example, assuming that these three bits are (b2, b1, b0), of these bits, (b1, b0) are allocated to one of three types of attributions: the rewritable attribution, the write inhibit (read only) attribution and the write-once (first-time writable) attribution according as (0, 0), (0, 1), (1, 0) or (1, 1). This allocation can be made through free selection. In addition, since it is possible to give eight types of attributions by the use of all of the three bits, a conditional readable attribution or a conditional rewritable attribution can also be an object of the allocation.

Thus, the "rewritable"/"non-rewritable" attribution can be given in units of blocks to the user data of the CD-ROM format.

Meanwhile, for the CD-RW, a method called fixed-length packet recording is used for allowing data to be rewritten at an arbitrary address.

Figure 10:
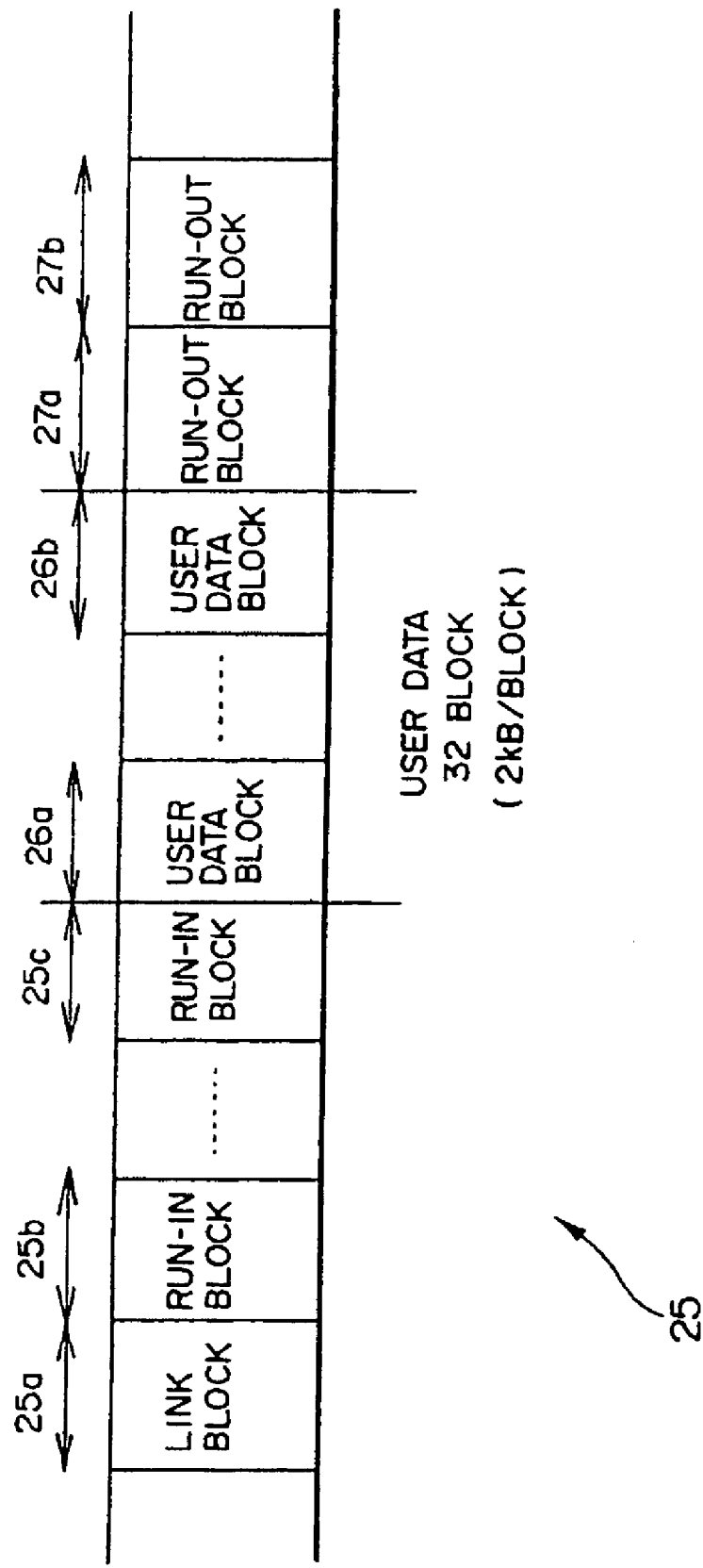
FIG. 10 is an illustration of a packet structure in the case of fixed-length packet recording.

FIG. 10 is an illustration of a packet structure in the fixed-length packet recording. In FIG. 10, a packet 25 forms a data recording unit in a fixed-length packet recording mode for the CD-RW, and this packet 25 is composed of a link block 25a, run-in blocks 25b, . . . , 25c, user data blocks 26a, . . . , 26b, and run-out blocks 27a, 27b. The link block 25a serves as a buffer area for preventing data destruction of the existing adjacent packet stemming from positional shifts of overwritten data. Each of the run-in blocks 25b, . . . , 25c and the run-out block 27a acts as an area for accommodating additional information to be added to the user data. Incidentally, the packet signifies a minimum group of data equally called a sector or cluster.

In this case, these plurality of blocks are grouped (one packet) and are overwritten according to packet. In addition, the user data shown in FIG. 10 is recorded in the form of packet with a unit of 64 k bytes (32 blocks). The description of these blocks will be omitted because of being described in the Orange Book Part 3. Moreover, the file management method for the fixed-length packet recording is prescribed in the UDF version 1.5 which will be mentioned later.

Furthermore, at the shipment from a factory, the packet structure shown in FIG. 10 is recorded on the overall surface of a disc through an operation called full formatting. At this time, for handling the fixed-length packet recording, the recording of any user data is acceptable, but in fact, "0" data is recorded. In addition, with respect to a formatted disc (disc formatted in a factory), meaningless data is recorded in the user data blocks 26a, . . . , 26b shown in FIG. 10, and when the user records and uses the user data, a fixed-length packet is overwritten in a state where the link blocks 25a of two packets adjacent to each other are set as a start point and an end point, respectively.

Still furthermore, of one byte of the above-mentioned header, three bits specified are made to indicate which of the link block, the run-in block, the user data block and the run-out block each block performs to.

Incidentally, in the formatted disc, it is also possible that, for producing a post ROM area, in place of the recording of the dummy "0" data at formatting, meaningful data is recorded and an attribution for each of the aforesaid data blocks is set as the write inhibit (read only) attribution.

Moreover, even in a case in which data is recorded in the form of a pre-pits row according to the fixed-length packet recording format to produce a master ROM area, if an attribution for each of the data blocks is set as the write inhibit (read only) attribution, then the overwrite on the master ROM area is preventable.

In this way, the three types of data areas: a master ROM, a post ROM and a RAM can be placed in a mixed state on the same disc.

Still moreover, in the formatted disc, by giving an attribution for each block, a rewritable area equipped with the write-once (first-time writable) attribution can thereafter be used as a pseudo write-once medium, so the user side can create a master ROM area.

When a data attribution is given for each block forming a basic unit of data in the CD-ROM format as described above, the recording drive unit for the CD-RW disc 10 can make a correct decision on the "write inhibit" and others through the above-described operations. That is, in the recording drive unit for the CD-RW disc 10, packet data to be recorded is first read out to rewrite the data of a given block of the packet in a memory of the drive for organizing the data in the packet and then the packet on the recording medium is rewritten actually.

In this case, when the data of the packet to be recorded is read out, the attribution of the block is decoded, and if a write inhibit (read only) block exists in the packet, an error message describing this existence is issued.

Figure 11:
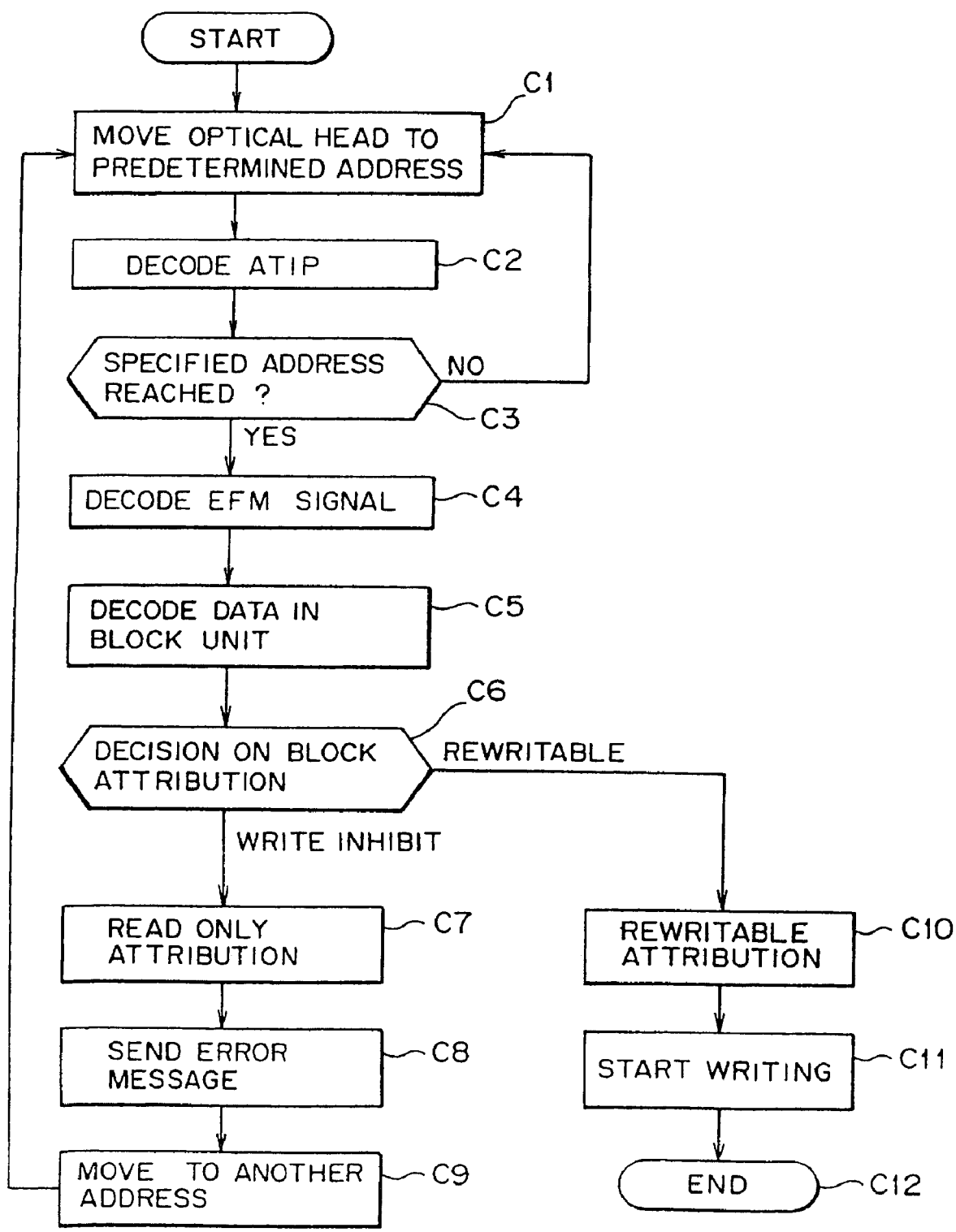
FIG. 11 is a flow chart showing file write utilizing a block attribution.

FIG. 11 is a flow chart showing file write utilizing block attributions. First, an optical head is shifted to a predetermined address (step C1) for performing the decoding of the ATIP (step C2). Subsequently, at a step C3, a decision is made as to whether or not it arrives at a specified address. If the specified address is not reached, a NO route is taken to repeatedly conduct the processing from the step C1. On the other hand, in the case of the arrival at the specified address, an YES route is taken, so an EFM signal is decoded at a step C4.

Following this, a signal is decoded in units of blocks at a step C5, and a decision on block attribution is made at a step C6.

If the block attribution is the write inhibit attribution, a write inhibit route is selected to make a decision to the read only attribution at a step C7 and send out an error message at a step C8, then followed by a step C9 where the optical head is shifted to another address for repeatedly conducting the processing from the step C1.

In addition, if the step C6 shows the rewritable attribution, the "rewritable" route is selected to make a decision to the rewritable attribution at a step C10 and start the writing at a step C11, then followed by a step C12 where the write routine terminates.

Incidentally, in the above-mentioned flow chart of FIG. 11, although the step C9 for shifting the optical head to another address is placed after the step C8 for sending out the error message, it is also possible that the routine terminates at the error message sending step C8.

As described above, a data attribution is given for each block forming a basic unit of data in the CD format, thus making a correct decision on the "write inhibit" and others. In addition, except for the overall erase, th recording drive unit can overwrite data in units of packets in a state where the link block 25a is used as the start point and end point.

Viewing the purpose of the use thereof, it is preferable that the attribution of a link block, particularly, a link block at a junction between a ROM area and a RAM area is set to the "rewritable".

In addition, only by rewriting a device driver incorporated into the firmware without altering the hardware on the recording drive unit side, it is possible to provide a CD-RW disc 10 with a phase change type medium where a RAM area and a ROM area are placed in a mixed state.

In this way, the access can be made with the same readout circuit and, therefore, it is possible to efficiently realize the data distribution function and the user data recording function, thereby promoting the use of the CD-RW disc.

The above-described three types of modes relate to methods in which a new attribution is added to data of each address basic unit according to address giving hierarchy, and the method itself which adds data attributions in units of address uses a method capable of maintaining the compatibility with the CD format.

In this case, in two or more hierarchies, in a case in which a data attribution is given to the same address basic unit, it is preferable that the data to be given in the higher hierarchy is the same as the attribution of the data to be given in the lower hierarchy.

Secondly, a brief description will be given of an example in which a data attribution is given to a variable-length basic data unit.

As examples of variable-length data units in the CD format, there are a track and a session in a multisession format. In addition, in the fixed-length packet recording format prescribed in the UDF1.5, a data unit using a plurality of fixed-length packets sequentially is also one example of the variable-length data unit.

In the CD-ROM format, the track corresponds substantially to a case in which the number of blocks is not fixed with respect to the group of user data blocks 26a, ..., 26b shown in FIG. 10. Accordingly, as well as the fixed-length packets, it is possible that a data attribution such as "write inhibit" is given to each block belonging to the track.

On the other hand, a data attribution on the track per se is given to a header of a leading run-in block of the track. The write inhibit (read only) attribution, the write-once (first-time writable) attribution or the rewritable attribution can be given in units of tracks through the use of free bits thereof.

Moreover, the start and end addresses of a track, the data length and others are written as TOC at a subcode Q channel of an EFM signal in the lead-in area. At this time, it is preferable to describe each track attribution. Still moreover, when needed, that track attribution can be put in the user data (main channel) equipped with the subcode Q channel. Only dummy data usually taking "zero" is written in the main channel (a user data portion in the block structure shown in FIG. 7) of the EFM signal in the lead-in area, and therefore, there is no problem when auxiliary data is written in that main channel, and the recording drive unit reads out not only the subcode but also the main channel even in the lead-in area.

In particular, the address information (start and end addresses, data length, and others) of a track has a read only area attribution expressed with master ROM data comprising a pre-pits row and, hence, can also be written (registered) as master ROM data, likewise comprising a pre-pits row, in the address main channel of a part of the lead-in area.

Furthermore, in the fixed-length packet recording format, in a case in which variable-length comprising a plurality of sequential packets is master ROM data comprising a pre-pits row, the address information of the sequential packets is written (registered) as mater ROM data in the main channel of the lead-in area.

Concretely, as the start address, there is used the address of the first run-in block of the leading packet or the address of the first user data block of the leading packet. In addition, as the end address, there is used the address of the rear-end run-out block or the address of the rear-end user data block. Furthermore, in the fixed-length packet recording format, the addresses of the run-in, run-out and link blocks are skipped (the addresses are not put to use), and new addresses are allocated in order to only the user data blocks.

Moreover, a high-level logical address is also available. Paying attention to this logical address, the logical address of the leading user data block can also be used as the start address of that ROM area, while the logical address of the rearmost-end block can also be used as the end address of that ROM area.

In addition, a description will be given of a method of dividing a program area according to a prescription of a multisession format into a plurality of sessions for setting a portion of divided sessions as the read only sessions and setting the remaining sessions as the rewritable sessions. Concretely, in a multisession disc, in the case of a P-ROM in which specified sessions are set as the write inhibit (read only) sessions, it is preferable that an attribution representative of whether each session is the write inhibit (read only) session or the rewritable session is written in the lead-in of that session. For this purpose, the Q channel of the subcode is likewise put to use.

That is, in the multisession format, one CD including the lead-in area/program area/lead-out area shown in FIG. 4(a) is divided to construct a plurality of pseudo CDs on the same CD.

Figure 13:
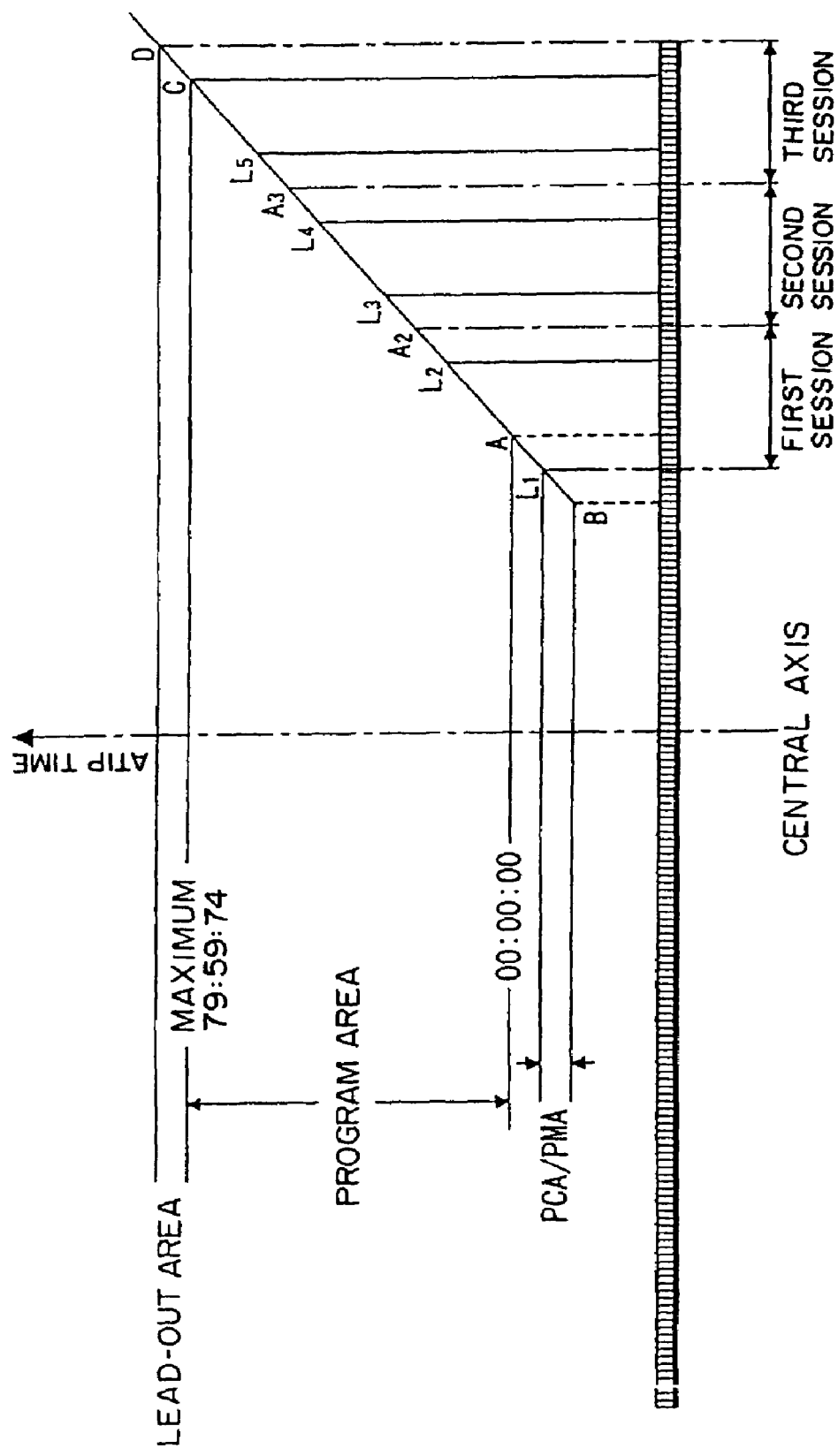
FIG. 13 is an explanatory illustration of an example of an area configuration of a CD having a multisession format partitioned into three sessions.

FIG. 13 is an illustration for explaining an example of an area configuration of a CD having a multisession format which is partitioned into three sessions. In each session, its head section is equipped with a lead-in area while its rear end section is equipped with a lead-out area. In FIG. 13, a lead-in area $L_1A$ of a first session indicated on a straight line written obliquely on the right side corresponds to the lead-in area shown in FIG. 4(a). In addition, $AL_2$ represents a program area of the first session, and $L_2A_2$ designates a lead-out area of the first session. Still additionally, $A_2L_3$, $L_3L_4$ and $L_4A_3$ denote a lead-out area, program area and lead-out area in a second session, respectively, while $A_3L_5$, $L_5C$ and CD depict a lead-in area, program area and lead-out area in a third session, respectively. The PCA area and the PMA area are placed at the innermost circumference $BL_1$ of the entire disc as well as the case shown in FIG. 4(a).

Moreover, the data structure of each lead-in area is the same as that of the program area, and the subcode is likewise added thereto. In the lead-in area, the user data is dummy, and only the subcode information is used for the purpose of the control of the system. Still moreover, in the case of the fixed packet recording, in addition to the program area, the lead-in area and the lead-out area are also formatted with the packet structure shown in FIG. 10.

The structure of the subcode Q channel is identical to the structure shown in FIG. 8, the file management information of each session, the session attribution information and others are additionally written at the low-order 92 bits.

A description will be given hereinbelow of methods of giving an attribution utilizing the subcode Q channel, that is, methods (1) and (2) of giving attributions such as the read only attribution, the write-once attribution and the arbitrarily rewritable attribution. In these methods, it is necessary that all the attributions defined are the same in the data included in one session.

(1) Method MS1

Four bits of a CONTROL bit similar to those shown in FIG. 8 exist in the subcode Q channel of the lead-in area. The method described above in (A2) is directly applicable. That is, according to the prescription, in the same session, the data attribution defined by CONTROL needs to be constant in principle, and as with the method described in (A2), for a data track of SC3=1, the rewritable or write inhibit (read only) attribution is defined according to a combination of (SC2, SC1).

(2) Method MS2

In the specification of the low-order 92 bits in FIG. 8, there are a plurality of non-used bit assigns, so a new session attribution can be provided using any one of these bit assigns. As an example, when 2-byte data called POINT is A0 (BCD), since a session format attribution is written by one byte called PSEC, the spare bit assign thereof is put to use. Session format attributions prescribed in the current Orange Book relate to the applications of CD data, and are only as follows.

00 (hexadecimal): CD-DA or CD-ROM (Yellow Book)
10: (hexadecimal): CD-i
20: (hexadecimal): CD-ROM-XA Although a detailed description of each format will be omitted, in the present invention it can be defined as follows through the use of the low-order data of 2-place data in hexadecimal, where x represents a high-order place in hexadecimal.

x0: rewritable session
x1: write inhibit (read only) session
x2: write-once (first-time writable) session In this way, the rewritable, write inhibit (read only) and write-once (first-time writable) attributions can be defined according to session. Since the session is considered as a divided pseudo CD as mentioned above, a plurality of virtual CDs different in data attribution from each other are realizable on one CD.

In this connection, in a case in which a rewritable/non-rewritable attribution is given according to session, it is not always necessary to give the attribution in units of smaller data as described in (A1), (A2) and (A3), but the simultaneous employment enhances the reliability.

A description will be given hereinbelow of a logical format of a ROM/RAM-mixed P-ROM disc.

First, a CD-RW disc has a RAM area although partially, and the contents of the user data area is rewritable, and for this reason, preferably, the lead-in area is designed to be rewritable. Since a PMA area temporarily retains the file management information as well as the lead-in, RAM data is desirable. In addition, a trial write area PCA is also required to exist in a RAM area in view of its nature.

It is desirable that the information indicative of the CD-RW being a P-ROM is included in the lead-in area to which the drive first has access for acquiring information on the disc. In the present invention, when the file management information is written with RAM data, a simple erase operation, which will be described later, prevents the file management information in the ROM area from being erased unnecessarily, thereby preventing the presence of the ROM area from becoming unrecognizable. Usually, the lead-in area lies on the inner circumferential side with respect to the program area AC as indicated AB in FIG. 4(*a*). In a disc with the multisession format, the lead-in exists also in the program area AC, while the lead-in of the first session also exists on the inner circumferential side with respect to the program area AC, and the information about the entire disc is placed in the lead-in of this session. In the following description, including a case of single-session, unless otherwise specified particularly, the lead-in area of the first session will be referred to simply as a "lead-in area".

In a non-recorded CD-RW disc, special information such as disc attribution, recording condition or the like is placed in the lead-in area on the basis of the ATIP having the data structure shown in FIG. 5. It is preferable that the information indicative of the CD-RW disc being a P-ROM is first written therein. Although a plurality of possibilities can be considered from the current Orange Book Part 3, one concrete method is prescribing in disc subtype information of data called special information 1 in the ATIP. In FIG. 5, when (M1, S1, F1)=(1, 0, 1) appears in the lead-in area, the special information 1 is information to be written with the remaining bits.

The subtype of the disc therein is prescribed with, of one byte (the byte 22*c* in FIG. 5) for describing frame information, three bits (indicated by XXX in FIG. 5) but F1 of four bits indicative of upper places in the BCD. In this case, eight prescription manners are available, but they are not determined at present, and it will be possible to allocate the subtype of the CD-RW disc forming the P-ROM disc in the future.

Meanwhile, in the case of a recorded CD-RW, usually, in the lead-in area, such special information and closed session file management information are also recorded with EFM data. Accordingly, it is preferable that information indicative of the above-mentioned P-ROM is also recorded with EFM data in the above-mentioned lead-in area. Concretely, it is placed in a subcode Q channel. The subcode Q channel has the data structure shown in FIG. 8 even in the lead-in area, while the lead-in area has somewhat different contents of data to be recorded. In particular, in the case of the use of the above-mentioned ATIP special information 1, of the remaining 92 bits of the subcode Q channel shown in FIG. 8, the contents thereof are to be always recorded with specified bits. Such recording in which the ATIP special information in the lead-in area is duplicated into an EFM signal subcode has already been done in a CD-RW recording/readout drive unit put on the market.

In addition, in the case of the use of a P-ROM type CD-RW disc, in order to recognize that the recording drive unit is for the P-ROM and to prevent the destruction of the file management information of ROM data, if a master ROM area based on pre-pits exists, it is preferable to write it on the disc through the use of the ATIP special information.

On the other hand, in a case in which, as stated above, a write-once attribution is given to the data in a RAM area through the ATIP, EFM subcode and block attribution for using as a read only area after the recording, or in a case in which the write inhibit is established after a plurality of times of rewriting so that a read only attribution is given to produce a post ROM area for a P-ROM, it is preferable that information representative of the P-ROM is written in the lead-in area with only EFM data. Concretely, the subtype information of a disc of the aforesaid subcode Q channel is recorded as a P-ROM attribution.

In the program area, on the design of drive, certain limitation is imposed on the utilization of the subcode to the prescription of the data attributions constituting the object of the present invention, but, if anything, it is more preferable to use the subcode for the prescription of a subtype representative of the disc being a P-ROM in the lead-in area lying at the innermost circumference, or for the prescription of an attribution for each session in the lead-in area of each session in the multisession format. For this reason, it is positively available.

Figure 14:
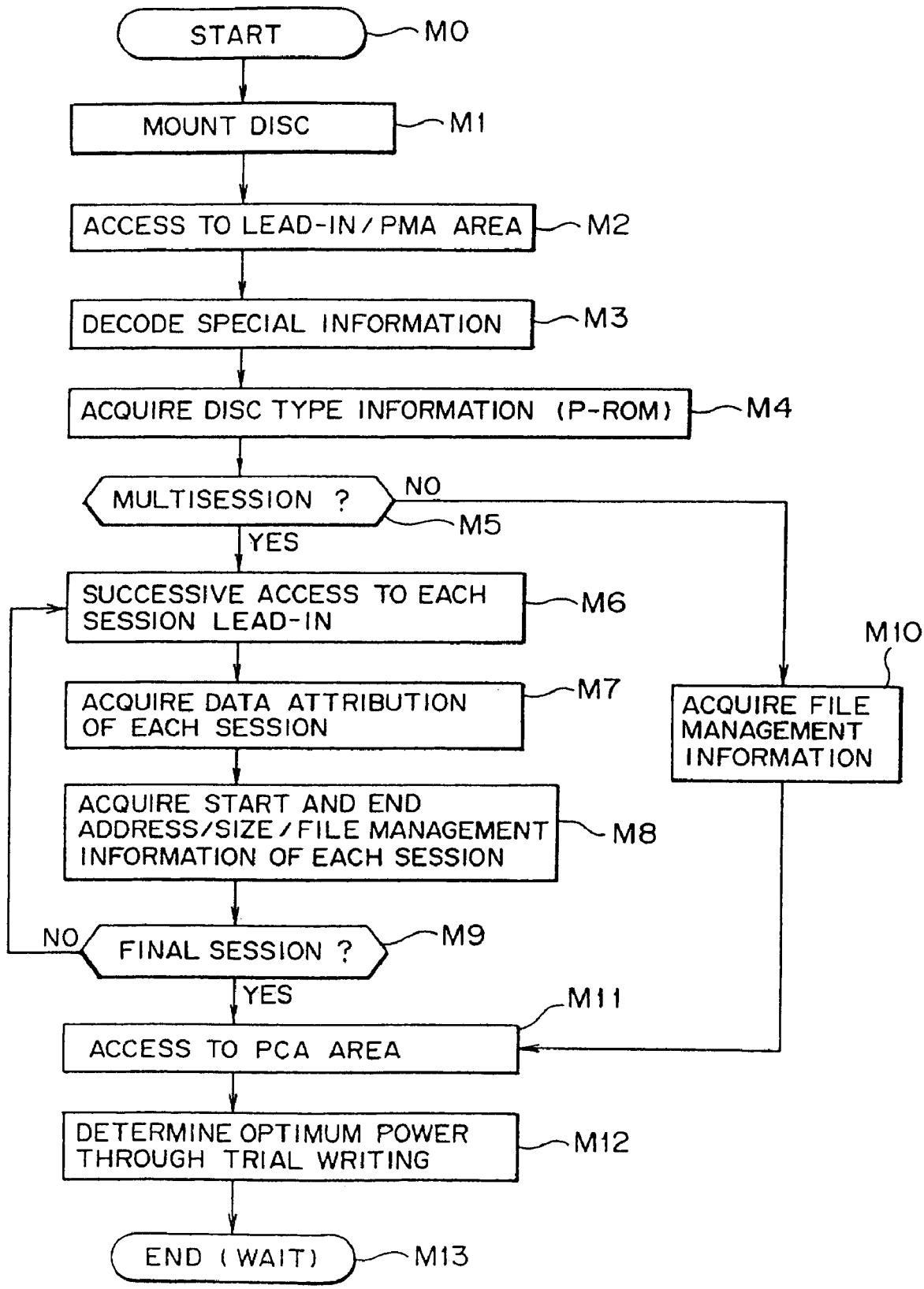
FIG. 14 is a flow chart showing an attribution decision according to session in the case of multisession.

FIG. 14 is a flow chart for attribution decision according to session in the case of the multisession, and is for describing an example of a flow chart in conducting file management according to session using a disc in which attribution information representative of the P-ROM is written in the lead-in and, in the case of the multisession, a write attribution is prescribed according to session.

The processing starts at a step M0, and a step M1 follows to mount a disc in a recording/readout apparatus and set the focusing and tracking servo of a recording/readout optical head after a predetermined speed of rotation is reached, thereby establishing the readout condition of the disc. Usually, in this stage, the state that the disc is not CD, CD-ROM nor CD-R but is a CD-RW disc is recognized on the basis of information such as reflectivity. Subsequently, at a step M2, the optical head has access to the lead-in area, and at a step M3, it decodes special information recorded with ATIP information or an EFM signal subcode in the lead-in area to start acquiring a disc type and disc control information such as a recommended recording condition.

Following this, a step M4 is executed to obtain the disc type information, and to seize that the disc is of a P-ROM type and has a read only area from a portion of the special information, more concretely, for example, from the above-mentioned special information 1 (see the description given with reference to FIG. 5). Then, at a step M5, a decision is made as to whether or not the disc has multisession.

In this case, if the information obtained shows the P-ROM and the multisession, an YES route is taken so that the lead-in of the respective sessions are accessed sequentially at a step M6, data attribution information written in the lead-in is obtained according to session at a step M7, and at a step M8 there are acquired the start address and end address (start address of the lead-out) of a program area in each session, the size of the session and, if the session is in a read only or recorded state, the file management information. Usually, the above-mentioned information are drawn in sequence from the session located at the inner circumferential side, and until the final session is confirmed at a step M9, a NO route is taken to repeatedly conduct the processing from the step M6 to the step M8.

Furthermore, in the case of single session, the NO route is taken at the step M5, and the file management information in a program area is acquired at a step M10.

Incidentally, although this flow chart does not indicate a step in which, after the disc type or the attribution information of each session in the multisession are acquired, they are stored in a temporary storage memory in the interior of the recording/readout apparatus, as well as other disc control information, attribution information of each session or the like, they are commonly stored in the temporary storage memory on all such occasions, and the following operation of the recording/readout apparatus is not required to re-read the information from the disc every time. In addition, a part of the control information, particularly, the information such as the disc type, attribution of each session, size and address, are not only stored in the temporary storage memory of the recording/readout apparatus but also transferred to a host computer connected to the recording/readout apparatus to be stored in a memory of that host computer. They are employed for application programs using the recording/readout apparatus, installed in the host computer side.

Moreover, when the attribution of each minimum session and the start/end address information is drawn from the lead-in area of each session, no problem occurs in the simple erase which will be described later. There is no need to acquire the file management information in the program area of each session, and it is also possible that the concrete file management information is read out at the first time when the concrete data is recorded/readout.

Thereafter, an YES route is taken from the step M9 so that at a step M11 the optical head has access to the PCA area, and at a step M12 an optimum recording power is determined in a manner that a trial write is made on the basis of the disc control information acquired in the step M3, and further at a step M13 the processing enters a waiting state until a concrete recording/readout command takes place.

Incidentally, it is also appropriate that the step M11 and the step M12 are successively implemented immediately after the step M3, or that they are executed after a concrete write start command is issued and immediately before the shifting to the recording from the waiting state step M13.

Meanwhile, for the CD-RW, there has been known a RAM data erase method called a simple erase operation. This is an erase method of making a file disappear apparently from the readout drive unit by erasing the file management information being the RAM data in the lead-in area or the PMA area or by rewriting meaningless data (repetition of zero). The existence of a predetermined file can be erased without erasing the contents of the file every time. Although the foregoing operation is conducted for each file or for each session in some cases, if the information at the innermost circumferential lead-in area in the disc is erased or rewritten, then the disc can apparently be used as a completely non-recorded new disc, which provides convenience.

On the other hand, in a case in which a read only area is provided partially like the present invention and even the file management information on the files in the read only area is recorded as rewritable data, there is a possibility that the foregoing simple erase operation erases the existence of the ROM data file in error to make further access difficult. In particular, although the contents of the file exist in the master ROM, the access to the file can be difficult, which eliminates the meaning of the formation of the master ROM area. In addition, there is a possibility that the data is overwritten without recognizing the master ROM area as a ROM area.

For this reason, in the present invention, it is preferable to give a write inhibit data attribution for preventing the erase of the ROM data by the direct overwrite, and further to take measures for the prevention from the erase of the ROM data stemming from the malfunctions in the simple erase operation.

Figure 15:
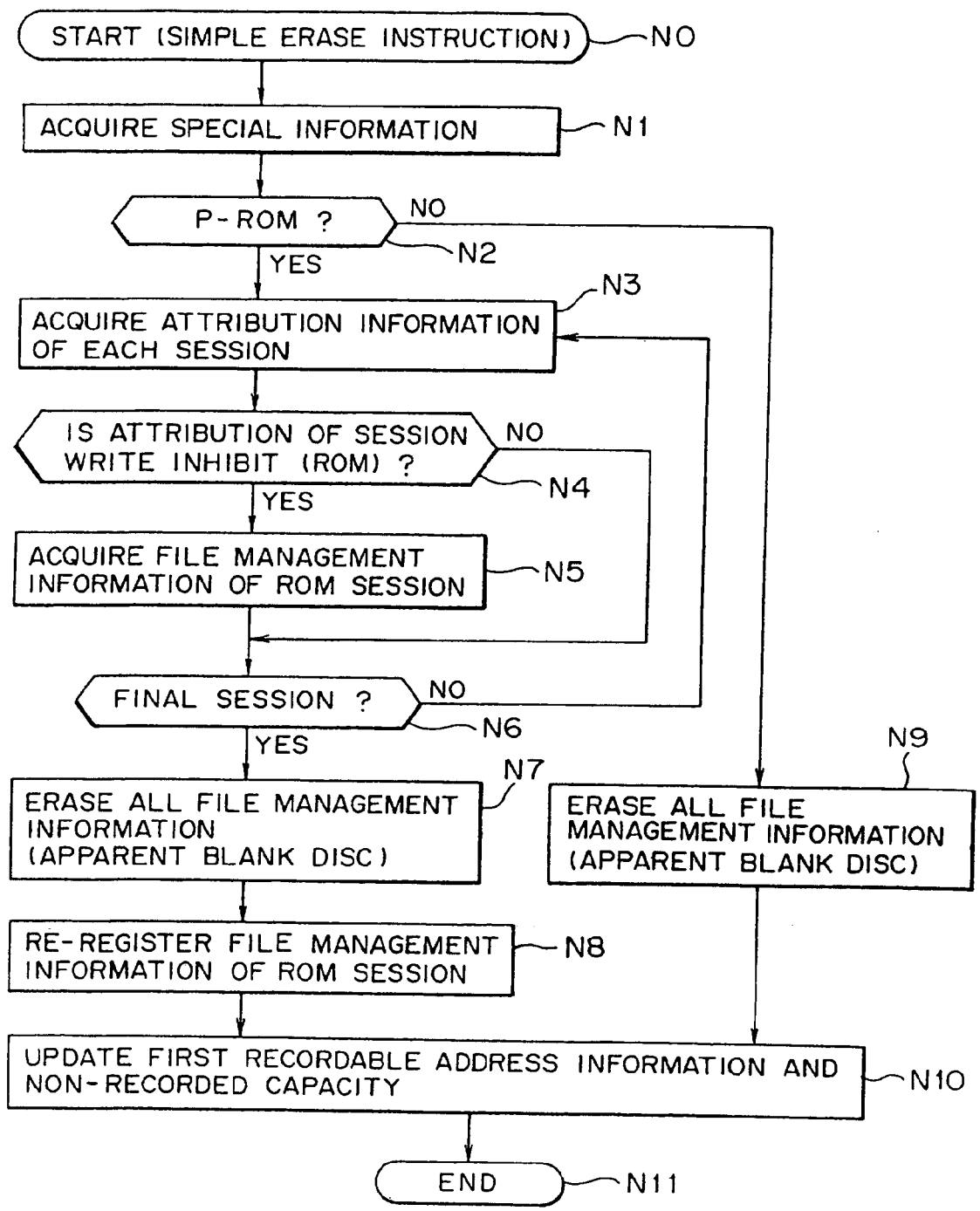
FIG. 15 is a flow chart showing one example of a simple erase method for a P-ROM.

A concrete approach is shown in a flow chart of FIG. 15. FIG. 15 is a flow chart showing one example of a simple erase method for a P-ROM. First, when a simple erase instruction is issued at a step N0, a step N1 follows to decode the special information recorded in the lead-in area of the first session area, then followed by a step N2 to identify and decide that the compact disc is of a rewritable type having a read only area (identification step).

That is, that the disc is a rewritable type compact disc having a read only area is recognized on the basis of the information in the lead-in area of the leading session accessed initially.

In more detail, recognized is identification information previously written in the form of pre-pits or a wobble on a substrate and representative of a recording medium being a rewritable type including partially a read only area comprising a pre-pits row or a wobble (recognition step).

Following this at a step N3, attribution information is extracted and acquired from each of the lead-in areas of a plurality of sessions (extraction step), and at a step N4, a decision on an attribution about the "rewritable" or "write inhibit" is made on the basis of the attribution information.

In addition, if the decision at the step N4 indicates the write inhibit (read only) attribution, an YES route is taken to, at a step N5, extract and acquire the file management information (file structure) in that write inhibit session and transfer it to a temporary storage memory (memory transfer step). This file management information includes all the information such as the start and end addresses of the ROM session and an address of a file written in a program area of the same session. Moreover, this step is repeatedly implemented until the last session is reached, and if a plurality of read only sessions exist, for each of the sessions, the file management information is acquired at the step N5 and is stored at the temporary storage memory. On the other hand, if the decision at the step N4 does not indicate the write inhibit (read only) attribution, a NO route is selected to arrive at a step N6.

At the step N6, the confirmation of the attributions up to the last session comes to an end, an YES route is taken so that, at a step N7, the lead-in area of the leading (first) session and the PAM area are accessed to erase all the file management information recorded in these areas (erase step). Accordingly, regardless of the "read only" or the "rewritable", all the files apparently disappear from the program area so that the entire program area falls into a condition recognized as "non-recorded". Incidentally, if that session is not the last session, a NO route is selected at the step N6 to repeatedly conduct the processing from the step N3.

Furthermore, at a step N8, the file management information (start/end address and others) of the write inhibit session transferred to the aforesaid temporary storage is re-registered in the lead-in area of the leading (first) session and the PMA area, and a step N10, the head address and recordable capacity of the rewritable area are updated (re-recording step), and then the processing comes to an end (step N11).

In this connection, in the case of a common CD-RW in which the disc comprises only a rewritable area, a NO route is selected at the step N2, and as well as the step N7, all the file management information in the lead-in and PMA areas are erased at a step N9, and further, the entire recordable area is newly re-registered as the "rewritable" at a step N10.

In this case, it is also possible that, as shown in FIG. 14, the steps N1 to N6 are implemented at the first stage (see the step M1), in which the disc is mounted in the recording/readout apparatus, to previously acquire the necessary information and store it in the temporary storage memory and, at the simple erase, the information to be acquired in the steps N1, N3 and N5 are obtained from the temporary storage memory when the simple erase instruction is issued at the step N0.

Accordingly, a data erase method for a rewritable phase change type recording medium according to the present invention is concerned with a recording medium having a phase change type recording layer on its substrate and having a read only area and a rewritable area in an information recording area.

The data erase method comprises a recognition step of recognizing identification information written in the form of pre-pits or a wobble on the substrate and representative of a rewritable type including partially a read only area comprising a pre-pits row and a wobble, a memory transfer step of acquiring address information in the read only area to transfer the address information to a storage unit, an erase step of erasing file management information written in a file management area, and a re-recording step of recording, in the file management area, the address information of the read only area transferred to the storage unit.

Furthermore, a description will be given hereinbelow of a data format for each of the ROM and RAM areas.

First, data structures to be recorded in a program area are roughly classified into two types of an ISO9660 format and a fixed-length packet recording format prescribed in the UDF (Universal Disc Format) version 1.5.

The ISO9660 format is designed to determine a procedure related to file management information for a CD-ROM (Yellow Book) intended for read only, and hence, is not highly suitable for the writable type file management. That is, it is made on the assumption that a specified file is fixed on a disc and exists at a sequential addresses, and is unsuitable for data structures randomly accessible like a hard disc and recorded in units of packet (a minimum group of data equally called a sector or cluster). However, this is a format which has come into widespread use and can be read out through a CD-ROM drive.

On the other hand, the UDF version 1.5 and multilead format (which will hereinafter be referred to simply as a "UDF format") has been determined by U.S. Business Group OSTA (Optical Storage Technology Association) as a subset of the international standard related to file structures, called ISO13340, and as a structure for fixed-length packet recording, there has commonly been employed a packet structure shown in FIG. 10.

This format particularly determines how to set file management information on a randomly accessible CD-RW and a disc serving as an equivalent virtual logical device, and is prescribed in order to facilitate control of files from a host computer and to ensure the compatibility.

A detailed description will be given hereinbelow of a logical structure of a partial ROM compatible with hardware of the existing drive, firmware, CD-ROM of host computers, device drivers of CD-R/RW drive and file formats of the UDF version 1.5.

That is, this relates to a medium with a logical structure in which a program area is divided into two sessions according to the prescription of the multisession format while the first session is used as a ROM area and the second session is used as a RAM area, or the first session is taken as a RAM and the second session is taken as a ROM area.

In a disc having a plurality of sessions according to the multisession format in this way, in the case of a P-ROM in which a specified session is used as "read only", in principle, it is preferable that all the file management modes of the respective sessions are the same. That is, in the current Orange Book, provided that the file management method of each of the sessions is standardized with the ISO9660 format or the UDF format, the file management method is acceptable even if differences occurs among the sessions. This is because the different sessions can be considered as virtually separate discs. However, in the case of the P-ROM medium, as will be described later, an interactive application can be considered where data of an application program is read out from a session forming a ROM to conduct predetermined processing in accordance with the program for recording the result immediately in a session forming a RAM, and the access between the session serving as the ROM and the session acting as the RAM can frequently be made for readout/recording of data. In general, the use of a method of eliminating the need for the switching of the file management mode according to switching between sessions is more preferable, for that the device driver becomes simple.

In addition, since the fixed-length packet recording of the UDF is preferable in the rewritable area, it is preferable to perform the file management in the UDF format in all the sessions.

However, it can be considered that, if anything, the use of different file management methods among the sessions is advantageous. One of these methods is that a device driver program capable of the file management in the UDF is written as ROM data in the first session according to the ISO9660 format and, when a disc is mounted in a recording/readout apparatus, the device driver is read out to allow the read/write of data in the UDF format. It is fit for such a using method.

Figure 12A:
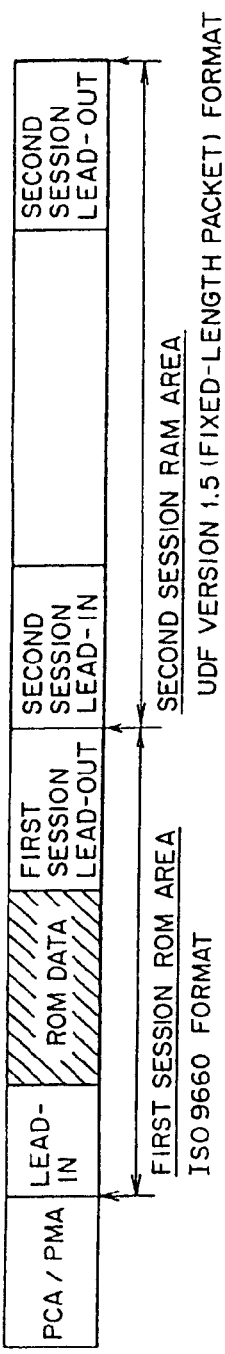
FIGS. 12(a) to (d) are illustrations of an area configuration corresponding to a P-ROM format.

More concretely, the first session is made as a ROM area while the second session is made as a RAM area, and a structure shown in FIG. 12(a) is taken where the ROM area is used as the ISO9660 while the RAM area is used as a fixed-length packet recording area according to the UDF format.

In a case in which the first session is set as the ISO9660 as shown in FIG. 12(a), the follow-up of the file management method of the ISO9660 becomes easier, for that, in the case of the ISO9660, the information about a logical address 16 located in the leading portion of the program area is obtainable. Incidentally, in general, the first address of the logical addresses corresponds to one block length of a CD-ROM format.

In the arrangement shown in FIG. 12(a), the first session is a ROM area while the second session is a RAM area, and the first session recorded in the ISO9660 format while the second session is subjected to writing according to the UDF format (version 1.5). In addition, a lead-in area and a lead-out area are provided at every session in accordance with the prescription of a writing mode based on the multisession mode. Still additionally, a start address of a non-recorded area subsequent to the second session forming the RAM area is recorded in the PMA.

The first session processed in this way is recognized as a closed session, and is recognized as a non-rewritable read only area according to the multisession prescription. Accordingly, a ROM data attribution is given to the first session units of the above-mentioned ATIP frame, subcode or block, and if the first session is put in a closed condition, this signifies that the re-write inhibit processing is doubled on the system, thus enhancing the reliability on the prevention from the ROM data destruction.

With such processing, the following data recording method becomes possible. That is, usually, after the access to the data attribution information in a read only area, there are conducted a transfer step in which program data recorded in a executable format in the read only area is transferred to an external computer and an execution step in which the program data is automatically executed in the external computer to record data in a rewritable area.

Figure 16:
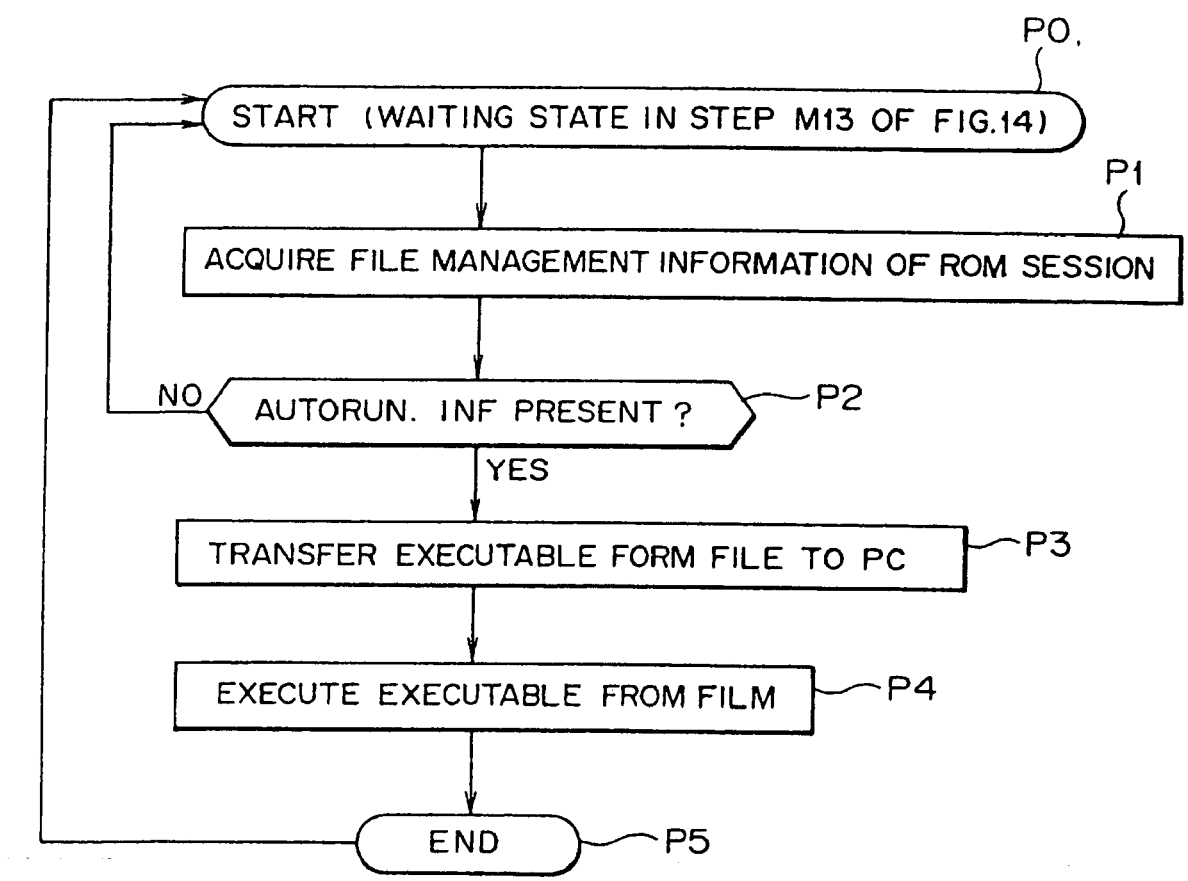
FIG. 16 is a flow chart showing one example of an automatic executive operation for ROM data.

FIG. 16 is a flow chart showing one example of an automatic execution of ROM data, and is an flow chart for explaining the automatic execution in a case in which a recording/readout apparatus is connected to a host computer whose operating system is Windows (product name, produced by Microsoft Corporation.

First, after a flow is implemented up to the step M12 in FIG. 14, the waiting step M13 is set as a step P0 in FIG. 16 and file management information in the first session forming a read only area is acquired according to the procedure of the ISO9660 at a step P1. In the Windows, a route directory is retrieved at a step P2 and, if a file named "autorun. inf" exists, an YES route is taken so that the file is transferred to the host computer at a step P3 and a program with the contents prescribed in the file are automatically started up at a step P4 (execution step). In this case, if the "autorun. inf" points out another executable format program files and uses it, the files pointed out are successively transferred to the host computer to be put in execution. At a step P5, the execution of a series of programs comes to an end, and the flow returns to the step P0. If the file named "autorun. inf" does not exist in the route directory, the flow returns to the step M13 in FIG. 14 and enters the waiting condition. If the file named "autorun. inf" is absent at the step P2, a NO route is taken to repeatedly conduct the processing from the step P0.

At present, the ISO9660 is important in maintaining the compatibility with a CD-ROM constituting an optical disc system which has come into the most widespread use and has been put on the market in a state almost 100%-contained in a computer. In particular, in the case of a bootable program whereby data of a ROM area is automatically read out by a host computer and implemented therein, the complete compatibility with the existing formats becomes necessary. In addition, it can be considered to employ a using method in which a device driver (and a program for installing it) which handles the UDF format which has not been widely spread is recorded as ROM data according to the ISO9660 format accessible from a common CD-ROM device driver and the program is read on th host computer to install the UDF device driver.

Figure 12B:
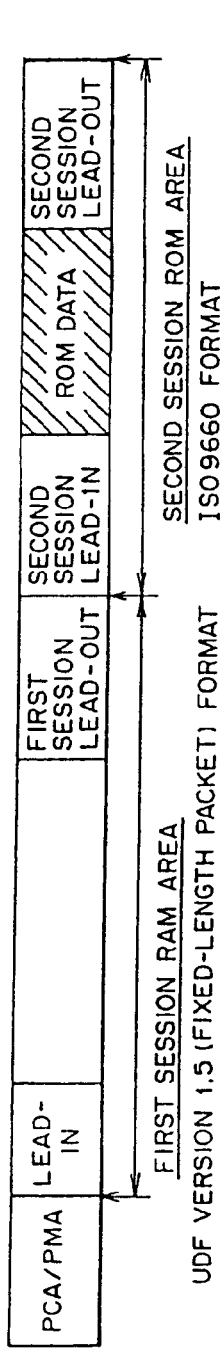

In an arrangement shown in FIG. 12(b), the first session serves as a RAM area in the UDF format while th second session acts as a ROM area in the ISO9660. In FIG. 12(b), a using method in which a conditional readout-permissible attribution is given to data in the second session is particularly useful that. That is, a recording drive unit writes user data only in the RAM area of the first session while a user cannot gain access to the second session, and only when inputting specified cipher information or the like, the user reads out the ROM information in the second session. Thus, since an area rewritable only by a desired user is provided, the handling becomes easy.

In any case, for the session of the ISO9660 format, all the blocks of the lead-in/lead-out and program area are made as user data blocks. In addition, for the session of the UDF format, a link block, run-in blocks, user data blocks and run-out blocks shown in FIG. 10 are formed in the lead-in/lead-out and program areas.

Furthermore, as shown in FIG. 12(a), (b), a program area is divided into two sessions according to the prescription of the multisession format, and the session used as a RAM area is collectively used as a fixed-length packet recording area according to the UDF format, which improves the convenience.

Figure 12C:
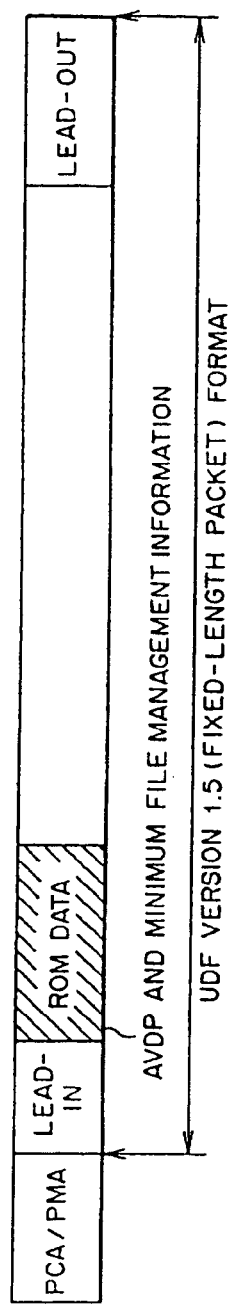
Figure 12D:
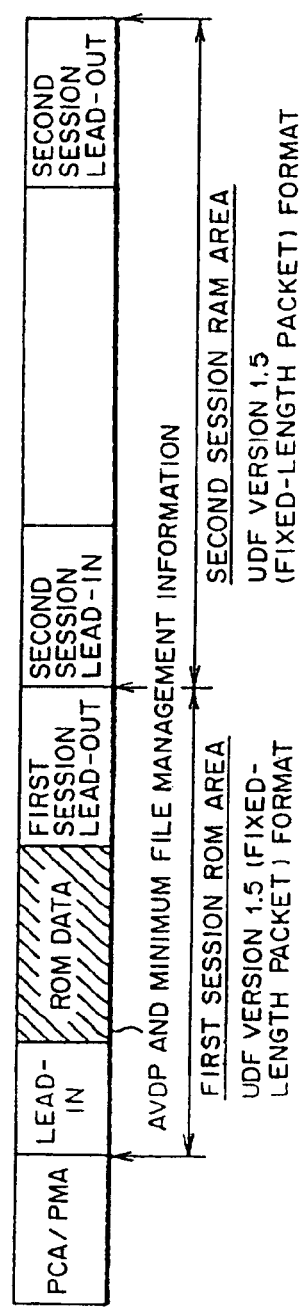

On the other hand, in some cases, it is preferable that the switching between the device drivers handling the ISO9660 and the UDF respectively is unnecessary. If the UDF handling device driver further comes into widespread use, for the CD-RW, it is preferable to control all the program area through the use of the UDF format. In this case, the layout shown in FIG. 12(c) or (d) is suitable. The layout shown in FIG. 12(c) is formatted to conduct the fixed-length packet recording of the UDF in a single session, with the switching between the ROM area and the RAM area being made through the link block shown in FIG. 10. In addition, the layout shown in FIG. 12(d) is a multisession format comprising two sessions, with one being used as a ROM area and the other being used as a RAM area. Both are formatted as shown in FIG. 10 so as to conduct the fixed-length packet recording of the UDF.

In the case of the layout shown in FIG. 12(c) and FIG. 12(d), it is preferable that the ROM areas are arranged in a state grouped on a sequential addresses. Concretely, for the ROM area, it is preferable that, for example, a group of file management information data described on the basis of the AVDP (Anchor Volume Descriptor Pointer, located in 257th address of the logical addresses) is written with RAM data and then arranged in a state where grouped.

Accordingly, when the size of the RAM data increases due to the rewrite of another RAM data or the alternate sector process, the addresses of the RAM data are free from separated, which is desirable on the system in shortening the access time and simplifying the file management information.

Also in all the cases shown in FIGS. 12(a) to 12(d), if a RAM area exists although partially and the contents of the user data area are rewritten, it is preferable that the lead-in area is rewritable. Because the PMA area also retains file management information temporarily as well as the lead-in, RAM data is preferable thereto.

However, in a case in which the lead-out area, particularly, the ROM data in the first session shown in FIG. 12(a), comprises a pre-pits row, it is preferable that the lead-out in the first session is formed with pre-pits. Since the lead-out data is never rewritten, the formation thereof with the pre-pits creates no problem if the address is fixed, and it is possible to omit the time needed for the formation of the lead-out by recording. In addition, in the file management information written in the PMA, only the information related to the first session can also be written with master ROM data comprising a pre-pits row.

Preferably, the above-mentioned recording processing of the lead-in and PMA (when needed, the recording of the lead-out) are conducted in a manufacturing process at a factory and the user side can read out the ROM data immediately without conducting the pre-processing or can conduct the writing in the RAM area.

Incidentally, in the case of this CD-RW disc 10, it is necessary that not only the ROM area but also the RAM area are recorded with an EFM signal and the absolute information depending on a subcode continues seamlessly. Usually, it is necessary that the linking between the ROM area and the RAM area corresponds to a linking between tracks or sessions each forming an unit of data in a compact disc. For the linking of data, there is a need to apply a linking rule at the additional portion of data prescribed in the CD-RW standard (Orange Book Part 3). In particular, preferably, at the linking between a ROM area formed with EFM signal data comprising a pre-pits row 52 and a RAM area, in order to avoid the presence of a non-recorded area between an EFM data signal to be overwritten and an EFM data signal of the pre-pits row 52, the recording of the EFM data to be overwritten begins to make the overwrite on the pre-pits EFM data signal in a range of approximately two EFM frames. Since the data of the pre-pits row 52 cannot be erased in the overwritten portion, the two types of data are placed in a state mixed to cause partial destruction of the EFM signal. However, in a range to this extent, the correction is possible by an error correction capability of a CD readout system, and the error does not propagate into the data outputted from the readout drive unit.

Thus, in the CD-RW disc 10, a logical ROM and a write-once type disc are realizable, and in a P-ROM disc having ROM data partially, it is possible to facilitate the identification of the ROM data and the RAM data, and further to construct a practical file management method.

(B) Other Modes

The present invention is not limited to the above-described embodiments and modifications thereof, and it is possible to cover all changes thereof which do not constitute departures from the spirit and scope of the invention.

Although the above description has been made considering the case of the use of the mode 1 format, other modes are also usable, and the difference between the modes does not affect the spirit of the present invention. In addition, although the multilayer structure has been described as being six layers as an example, the invention is not limited to the six layers.

Furthermore, the above description is not limited to the CD format but, for example, is also applicable to ADIP (address-in-pregroove) provided for an object similar to that of the ATIP. This ADIP is made to simply express an address in terms of a sequential integral numbers but not in terms of time. Moreover, the recording drive unit can add data with the same contents through the use of this.

In addition, as the wobble, it is also possible that both side walls of a groove are made to meander, or that one side wall of the groove is formed to meander. In the case of the meander of both the side walls, the meandering frequencies or modulation modes thereof can also be different from each other.

Still additionally, it is also acceptable that the wobble is realized with another periodical groove deformation, for example, with a variation of the depth of a groove. Naturally, this is also applicable to a medium which does not have a groove pitch made to be approximately 1.6 μm like the CD format, but which has a higher-density track pitch.

Figure 20A:
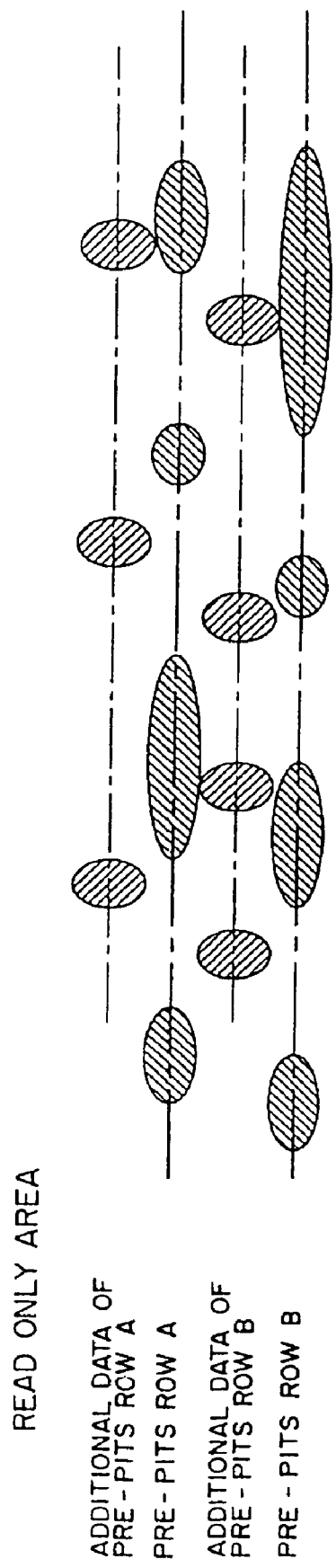
FIGS. 20(a), (b) are partial enlarged views, from above, illustratively showing a P-ROM on which auxiliary data is written between grooves or in flat portions between pre-pits rows.
Figure 20B:
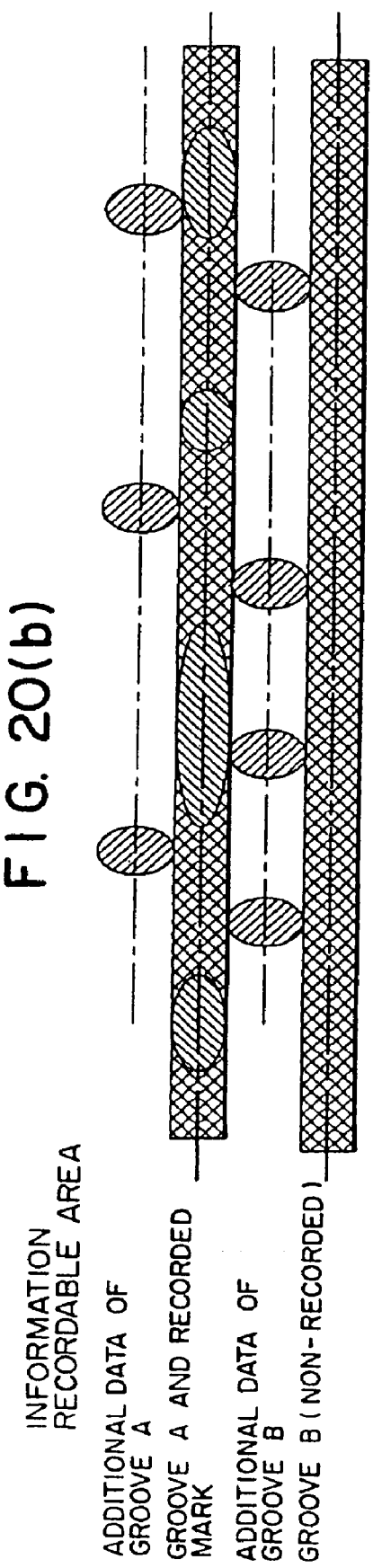

As the basic data unit written with a recording data row based on a pre-pits row or a phase change, there are a case in which auxiliary data such as address information is added as bit information similar to user data as well as the aforesaid subcode Q channel of the CD-RW format or the header information of the CD-ROM format and a case in which auxiliary data such as address information is previously written with a wobble or on a flat portion between grooves or pre-pits rows. For example, giving the auxiliary data by the wobble corresponds to the aforesaid ATIP frame of the CD format. On the other hand, deformed portions such as irregular pits or recording marks can be formed on an inter-groove portion between the adjacent grooves or a flat portion between the adjacent pre-pits rows. FIG. 20 show a case in which pit rows are provided between pre-pits rows and between grooves to give auxiliary data including addresses. Although a portion between grooves is commonly referred to as a "land", a flat portion between pre-pits rows can also be considered as a land in a wide sense, and deformed portions such as pits are provided in the wide-sense land portion along a data row of a basic unit of user data to give auxiliary data such as addresses. Also in this case, preferably, the auxiliary data information including addresses shown in FIG. 20(a), based on pits in the flat portion between the read only area pre-pits rows, and the auxiliary data information including addresses shown in FIG. 20(b), based on pits or recording marks between grooves in the recordable area, have the same logical structure, and the addresses continue in the read only area and the recordable area. Moreover, preferably, in addition to the user data, these auxiliary data have the equivalent physical signal characteristics in the read only area and the recordable area.

Furthermore, although the above-mentioned contents include, as an example, the identification information representative of a disc or P-ROM or the address information of the ROM area in units of tracks or sessions, which is written in the subcode Q channel in the lead-in, it is also possible that they are written in the main channel of the lead-in area.

In this case, the address information of the ROM area signifies at least one information (address or size) of a start address, end address and size (data length) in each ROM area. Moreover, in a case in which each ROM area includes a plurality of user data files, when file management information is added for controlling the file structure (directory structure, start/end address of each file, or the like) thereof, it can be considered as the address information of the ROM area in a wide sense.

In this case, it is also possible that the main channel of a portion of the addresses in the lead-in area is allocated to the writing of the aforesaid address information of the ROM area so that the address information of the ROM area is entered in the main channel of the lead-in area in the form of pre-pits. For example, since, at the recording of fixed-length packets, a large number of fixed-length packets are formed also in the lead-in as shown in FIG. 10, it is preferable that the aforesaid address information is written in the main channel of the user data block of a portion of the packets in the form of pre-pits.

In this connection, in a case in which the address information of the ROM area is recorded as master ROM data in the lead-in area, it is also possible that the ROM data is made with a wobble or the like modulated at a high frequency, instead of the pre-pits.

(C) APPLICATION EXAMPLES

A description will be given hereinbelow of application examples for effective use of a rewritable phase change medium having a read only area according to the present invention and execution means thereof.

A preferred mode of a P-ROM medium according to the invention is a medium having a read only area including a first read only area in which data is recorded in the form of pre-pits rows and a second read only area formed by inhibiting re-write of data and further having a rewritable area. In this case, the first read only area is a master ROM area while the second read only area is a post ROM area. That is, the aforesaid medium according to the preferred mode is made such that all the three types of areas: the master ROM area, the post ROM area and the RAM area, are placed on the same disc.

The content to be described hereinbelow is a concrete application example of a medium having these three types of areas.

Two types of data: a main routine comprising an execution program and a customized demonstration data collection comprising a plurality of contents, are collected as ROM data. For example, the main routine is a program which starts up a menu screen as a user interface and implements various types of processing in accordance with the user's selection. When the user selects the implementation of a specified demonstration through the use of the menu screen, the selected data is drawn from the demonstration data collection and the demonstration is implemented through a program of the main routine. Following this, the user data obtained through the repetition of the demonstration by the user or the like is recorded in the RAM area.

Furthermore, the program of the main routine is stored in the master ROM area, and in order to achieve the customizing for offering a different content to each user, the demonstration data collection is stored in the post ROM area, and the user data is recorded in the RAM area.

The case of a rewritable type compact disc will be considered for a concrete description.

In such a medium, it is preferable that the application program and the user data are recorded in fixed-length packet units having the same file management structure, and that a file management method according to the UDF format is employed.

Figure 17:
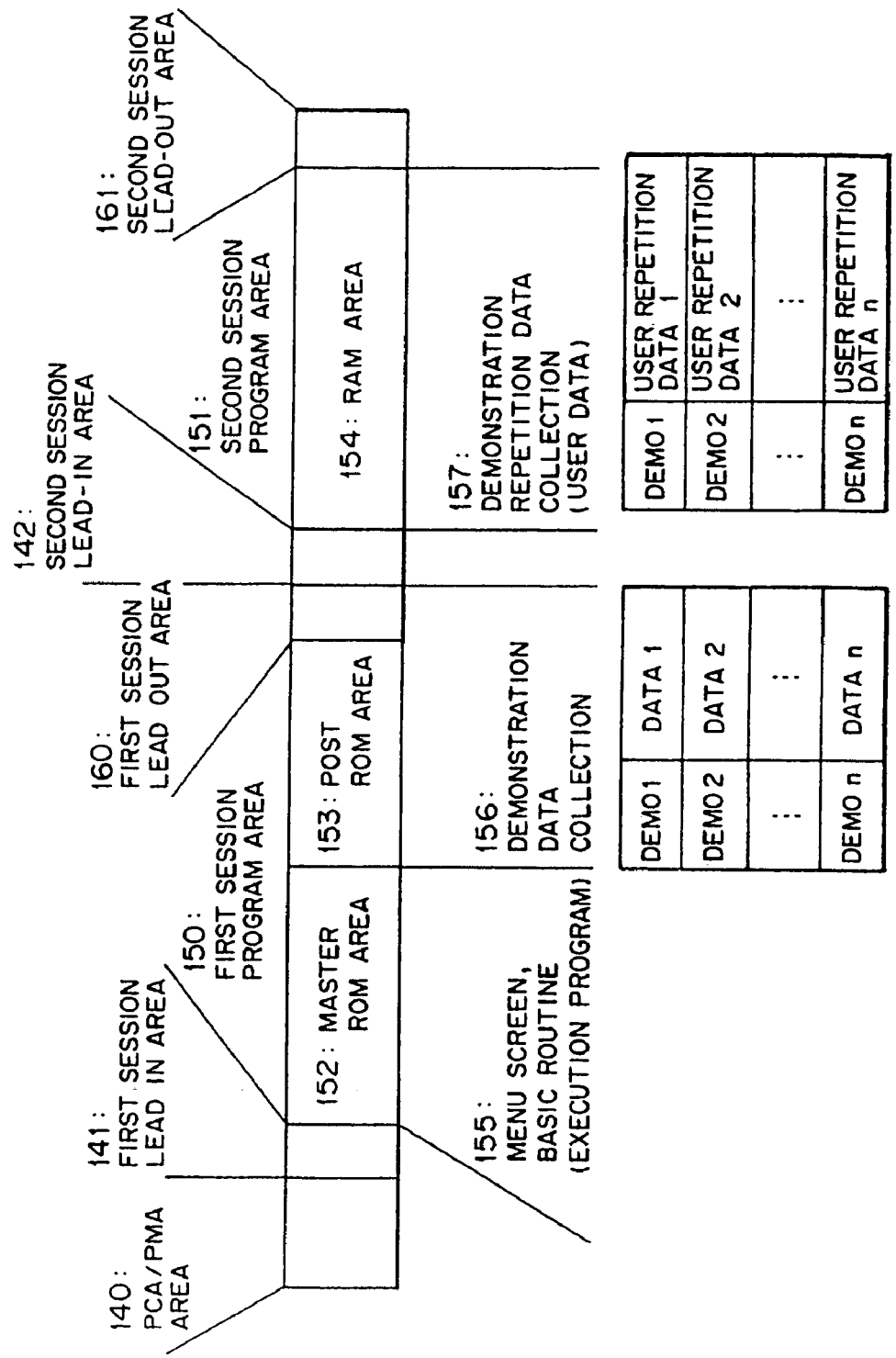
FIG. 17 is an illustration of one example of a P-ROM data arrangement.

That is, for example, data is arranged on a recording medium as shown in FIG. 17.

FIG. 17 is an illustration of an example of an arrangement of P-ROM data. The P-ROM medium shown in FIG. 17 is such that an application area storing predetermined application program data is formed in consecutive areas at the innermost circumference of the program area AC shown in FIG. 4(*a*) as the first session having a ROM attribution, and a user data recording area, in which user data related to at least the aforesaid application program is recordable, is set in the remaining areas as the second session having another RAM attribution.

At this time, the ROM attribution session (program area 150 of the first session) including the application program is composed of both a master ROM area 152 and post ROM area 153. This ROM attribution session (the master ROM area 152 and the post ROM area 153) is closed with a first session lead-in area 141 and a first session lead-out area 160, and the RAM attribution session (RAM session) is closed with a second session lead-in area 142 and a second session lead-out area 161. Moreover, both the first session and second session have the packet structure shown in FIG. 10 according to the prescription of the UDF, and in the second session including a RAM area 154, the block structure shown in FIG. 10 is previously recorded with RAM data and formatted according to the prescription of the UDF.

In addition, the attribution of the entire first session including the application program is set as a write inhibit (read only) attribution, and a master ROM area comprising a pre-pits row and a post ROM area comprising a non-recorded area (where only a guide groove exists) are continuously formed in the first session program area 150. The end of the master ROM area 152 and the start of the post ROM area 153 are connected to each other through the link block 25a shown in FIG. 10.

Still additionally, preferably, a read only or rewritable attribution is given in session units, and a data attribution is prescribed in ATIP frame, EFM frame or block units. That is, a write inhibit (read only) attribution is given to the master ROM area 152 comprising a pre-pits row, while a write-once (first-time writable) attribution is given to the rewritable non-recorded area. Most preferably, as mentioned above, not only the pre-pits row of the master ROM area 152 but also the groove of the post ROM area 153 are wobbled to give a data attribution according to the ATIP.

Moreover, the recording of each of the master ROM data and the post ROM data is made only on the factory or software manufacturer side, and after distributed to users, is recognized as a write inhibit (read only) session on the basis of the attribution prescription on the first session on the user side.

Still moreover, the switching from a pre-pits row having a wobbling center line from a wobble is made at the boundary between the master ROM area 152 and the post ROM area 153, and addresses based on ATIP information are continuously given.

In particular, if an application for language practice is taken as a concrete application example of the latter, a basic routine (execution program) 155 for implementing demonstration data on the basis of the menu screen for the user interface in FIG. 17 or the selection from the menu screen is stored in the master ROM area 152. This basic routine is made as a master ROM because of not depending on the type of foreign language to be learned, that is, because of not depending on a user being an object. The main routine is displayed in the mother tongue of a learner, for example, in Japanese.

In this case, the demonstration data corresponds to the pronunciation of a phrase presenting a model, and is stored as the demonstration data collection 156 in the post ROM area 153. The contents of the demonstration data vary between different languages, and are recorded in the post ROM area 153 on the factory or software manufacturer side. The contents comprise a plurality of phrases, and the phases are separately set as data 1 of a demo 1, data 2 of a demo 2, . . . , data n of a demo n, and are arranged so that the direct access to the data of every demonstration number can be made in accordance with the selection from the menu screen. The data produced with a user repeating the phrases of the demonstrations are converted into a digital form through an AD conversion to produce repetition data 1 of the demo 1, repetition data 2 of the demo 2, . . . , repetition data n of the demo n which in turn, are stored as a table (demonstration repetition data collection) 157 in a RAM area 154.

As an execution means using this medium, a recording/readout apparatus according to the present invention forms, as a session (read only area) having a ROM attribution (read only attribution), an application program area storing predetermined application program data in consecutive areas at a inner or outer circumferential side of a program area while setting, as another session (rewritable area) having a RAM attribution (rewritable attribution), a user data recording area, in which user data related to at least the application program is recordable, in the remaining areas of the consecutive areas, and conducts the readout of the application and the recording/readout of the user data related to the application. In addition, the recording/readout apparatus proposed according to the invention is made up of a recognition means for accommodating the foregoing disc-like medium and for recognizing the presence of a P-ROM (a rewritable phase change type optical disc having a partial read only area), a program execution means capable of gaining access to a ROM session recognized by the recognition means to acquire data of an application program for executing the contents of the program, an information inputting means capable of inputting necessary information in accordance with the application program executed by the program execution means, and a recording means capable of gaining access to the user data recording area to record, as user data, the information inputted through the information inputting means.

Figure 18:
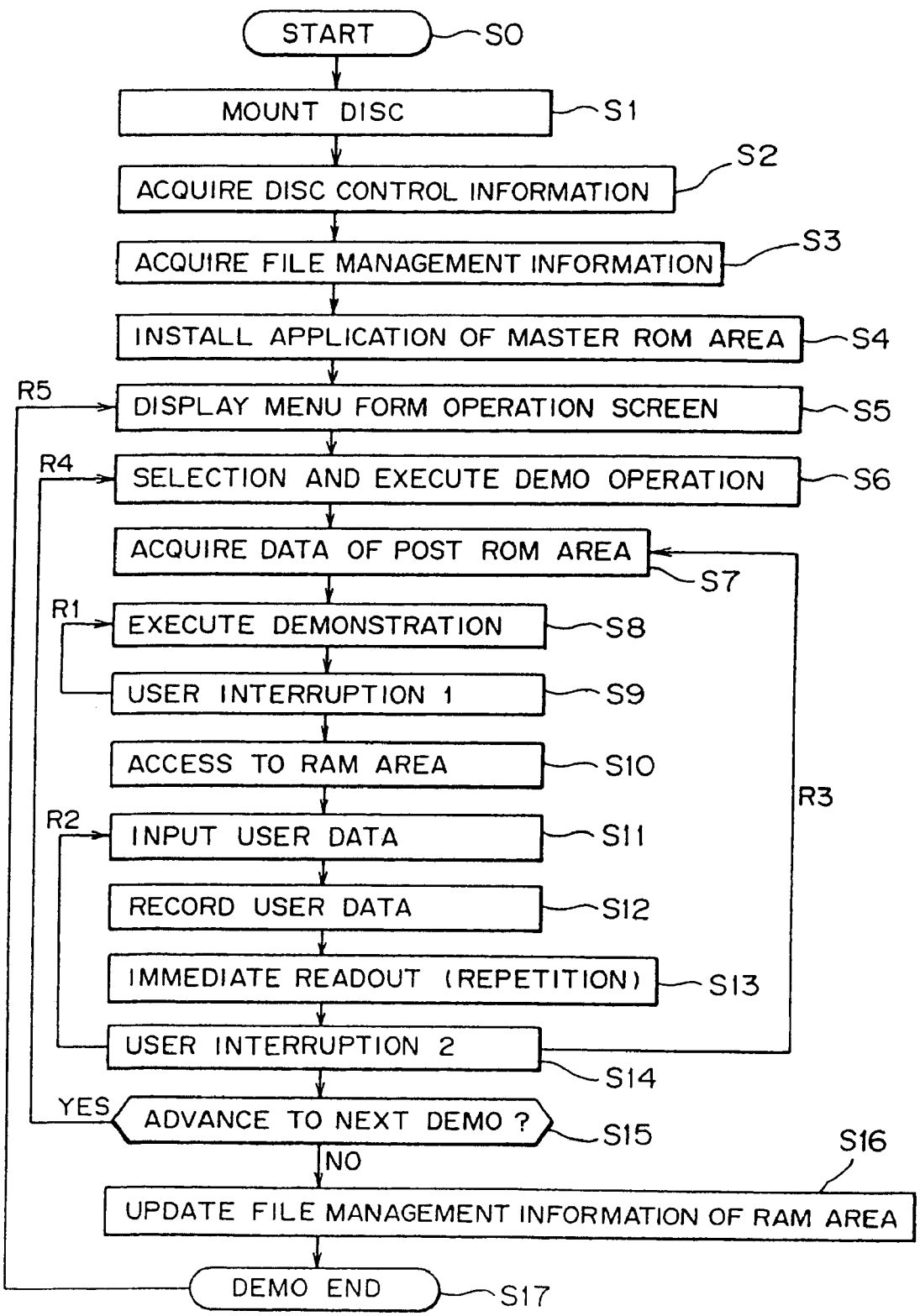
FIG. 18 is a flow chart for explaining a P-ROM recording/readout method.
Figure 19:
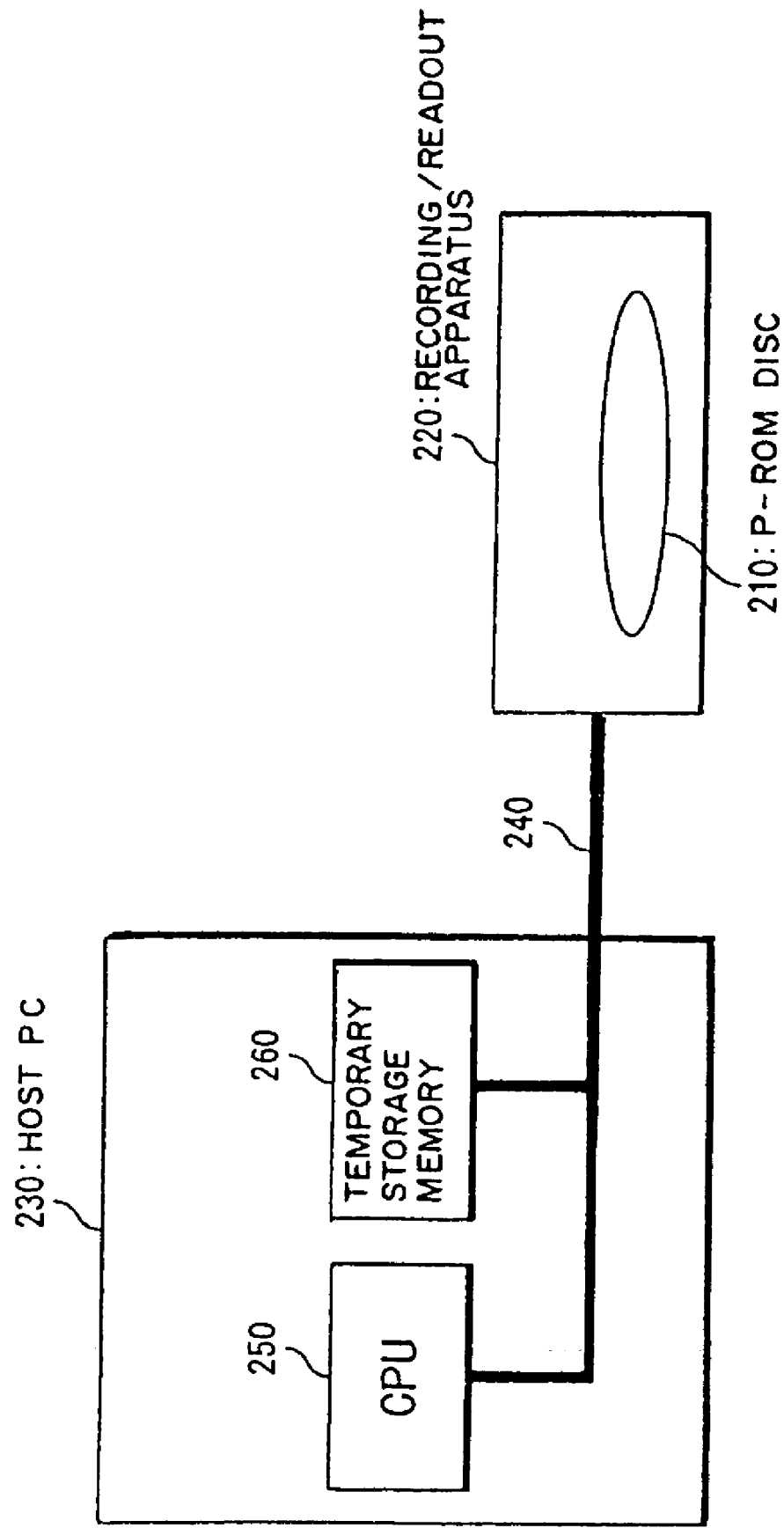
FIG. 19 is an illustration of a configuration of a recording/readout system according to an embodiment of the present invention.

FIG. 18 is a flow chart for explaining a recording/readout method for a P-ROM. This flow chart is realizable with, for example, a recording/readout system shown in FIG. 19. FIG. 19 is an illustration of a configuration of a recording/readout system according to an embodiment of the present invention. This recording/readout system shown in FIG. 19 includes at least a CD-RW disc (P-ROM disc) 210 having a partial read only area, a recording/readout apparatus 220 for conducting the recording/readout on/from the medium, and a host computer (host PC) 230 connected to the recording/readout apparatus 220. The host computer 230 includes an interface for the input/output with respect to users. The recording/readout apparatus 220 and the host computer 230 are connected through a data transfer line 240 to each other to achieve mutual data transfer therebetween. A CPU 250 of the host computer 230 decodes application programs. A temporary storage memory 260 thereof is a solid state memory or hard disc, and is used as a work space in the middle of the execution of a program.

The processing starts at a step SO in FIG. 18, and a P-ROM disc according to the present invention is mounted at a step S1. At this time, usually, the rotation of th disc starts, and the focusing, tracking servo and others are set up. Subsequently, at a step S2, control information on the disc are read out from a lead-in area, a PMA area and a PCA area. This disc control information is information on optimum recording power at recording or linear velocity, and is for making a decision that the disc is of a CD-RW type and of a P-ROM type.

Then, at a step S3, from the lead-in area and the PMA area, a decision is made that the disc has a multisession. Moreover, file information is acquired from a program area of the first session forming a ROM session.

The processing from the step S1 to the step S3 is implemented in the CD-RW recording/readout apparatus 220. In more detail, in each of the steps S1, S2 and S3, a flow is implemented as shown in the flow chart of FIG. 15.

Following this, at a step S4 of FIG. 18, data of a main routine of an application program in the master ROM area on the CD-RW disc 210 is read into the host computer 230 so that the CPU 250 of the host computer 230 implements the following steps while interchanging data with the recording/readout apparatus 220.

Usually, as indicated in a step S5, a menu screen serving as a user interface is initially started up to make a user select the following operation of the execution program. At this time, at step S6, the implementation of a demonstration and the contents of the demonstration to be implemented are selected and the implementation start of the demonstration is directed. In this case, the demonstration first selected will be referred to as "demo 1".

Furthermore, at a step S7, a predetermined address in the post ROM area 153 of the CD-RW disc 210 retaining the concrete contents of the demonstrations is accessed to acquire the data on the demo 1. Usually, this data is temporarily stored in a temporary storage memory, such as a solid state buffer memory or hard disc, in the host computer and then read out from this temporary storage memory 260 to be converted into a voice or image and used as a demonstration at a step S8.

For example, assuming that the application is a language practice or the like, in the process of executing the application program, a demonstration for uttering a predetermined sentence is read out to make a user input information according to that demonstration.

Still furthermore, at a step S9, an interruption 1 from the user takes place, and if the data input is not made from the user, a route RI is taken to repeatedly conduct the demonstration, and if the interruption 1 to the effect of the shifting to the user data input is executed, at a step S10, the RAM area of the CD-RW disc 210 is accessed and falls into a waiting condition, and at a step S11, the data input is made from the user. In an example of the language practice, this corresponds to the repetition of the contents of the demo 1 by the user. The voice data is AD-converted in the host computer 230 and temporarily stored in the temporary storage memory 260 in the interior of the host computer 230. In addition, it is also possible that the user data and the data of the demo 1 are allocated to the left and right channels, respectively, and combined for the stereo recording. This facilitates the comparison between the contents of the demo 1 and the contents of the repetition by the user.

Thereafter, at a step S12, the data is transferred to the recording/readout apparatus 220 and the user data is recorded in the RAM area of the CD-RW disc 210, and at a step S13, the data inputted by the user is immediately read out, when needed. At this time, in an user interruption 2 at a step S14, a route R2 for re-inputting user data or a route R3 for returning to the repeated implementation of the demo 1 is selectable, and if not required, at a step S15, a selection is made between the shifting to the next demonstration (demo 2) and the termination of the demonstration. In the case of the shifting to the next demonstration, a route R4 (YES route) is taken for returning to the step S6 to conduct the demonstration selection operation.

For the termination thereof, a NO route is selected so that, at a step S16, the file management information is updated on the basis of the user data newly recorded in the RAM area and at a step S17, the demonstration comes to an end, and the operational flow returns through a route R5 to the menu screen.

In addition to the above-described concrete example such as language practice, the CD-RW having three types of areas of a master ROM, post ROM and RAM according to the present invention can also accept a using method in which an application program of the first version is stored in the master ROM area and, when a partial version-up (updating) thereof is needed, only a portion required for the program correction is stored in the post ROM area. It is also possible that the first-version application program is made as a updating-unnecessary basic program common to all applications to be added as a post RAM afterwards.

Still additionally, in FIG. 17, although the master ROM, post ROM and RAM are arranged in order from the inner circumference, it is not always necessary that this order be taken. Moreover, it is also possible that the master ROM, post ROM and RAM are arranged according to the UDF format which does not make the partitioning into sessions as shown in FIG. 12(c).

INDUSTRIAL APPLICABILITY

As described above, according to the present invention, in a rewritable phase change type disc, particularly, a CD-RW, three types of data attributions of write inhibit (read only), write-once and arbitrary rewrite can be prescribed according to frame of 1/75-second unit forming a basic unit of data in a CD format, or according to block of user data. This enables the intended rewritable type data to be handled as logical ROM data. In addition, the CD-RW can apparently be used as a write-once type medium.

Moreover, in a P-ROM disc in which a physical ROM area comprising pre-pits or the aforesaid logical ROM area and a RAM area are mixed and both coated with a phase change medium, it is possible to inhibit the overwrite on ROM data, thus preventing the destruction and falsification of the ROM data.

What is claimed is:

1. A data recording method for use in a rewritable phase change type optical recording medium having a phase change type recording layer on its substrate and having a first read only area and a rewritable area of the same multilayer structure in its information recording area, wherein the optical recording medium includes data and address information in the first read only area and the rewritable area include basic data units having the same logical structure, auxiliary data capable of distinguishing between read only data and rewritable data is provided in a basic data or in a data unit formed by a plurality of basic data units, whereby a groove is formed in the rewritable area to have a wobble made so that a center line thereof shows a predetermined amplitude with respect to a recording/readout optical beam scanning direction, and the data in the first read only area is obtained by a plurality of pre-pits rows made on the substrate, while a center line of a pre-pits row in the first read only area has a wobble to show an amplitude substantially equal to the amplitude of the groove with respect to the optical beam scanning direction, and consecutive address information is given by the wobble of the groove and the wobble of the center line of the pre-pits row, and a carrier frequency due to the wobble of the groove and the wobble of the center line of the pre-pits row is frequency-modulated or phase-modulated with digital information to provide the auxiliary data, identification information representative of an optical recording medium having a first read only area, said identification information is written in a specified area of the optical recording medium in order to make the recording system recognize a rewritable type medium in which the phase change type recording medium partially has the first read only area, and the identification information is previously written on the substrate of the specified area of the optical recording medium as data such as pre-pits or wobbles, and at least a starting address of the first read only area is previously written on the substrate of the specified area of the optical recording medium as data such as pre-pits or wobbles, wherein the data recording method, comprising:

first recognizing step for getting the identification information of the optical recording medium and recognizing that the medium is a rewritable phase change type optical disc having a first read only area;

a program executing step for gaining access to the first read only area recognized by the first recognizing step to acquire data of an application program for executing the contents of the application program;

an information inputting step for inputting required information in accordance with the application program executed by the program executing step; and a first recording step for recording the required information inputted through the information inputting step, wherein the first recording step comprising:

a second recognizing step for recognizing the auxiliary data in an area to be recorded; and a second recording step for recording the required information of the first recording step, when the area is the rewritable area, while sending an error message to move to another area, when the area is the first read only area.

2. A data recording method according to claim 1, wherein said optical recording medium is a medium which uses fixed-length data as said basic data unit containing said auxiliary data.

3. A data recording method according to claim 1, wherein data in an information recording area of said optical recording medium is an Eight to Fourteen Modulation signal (EFM signal) compatible with a compact disc.

4. A data recording method according to claim 3, wherein a prescription on a rewritable attribution or a read only attribution is placed in an Absolute Time In Pre-groove (ATIP) frame of said optical recording medium.

5. A data recording method according to claim 4, wherein said ATIP information of the optical recording medium is stated in terms of an absolute time of a two-digits BCD code in units of minute, second or frame, and when the most significant bits in eight bits for expression of the minute, second and frame are respectively taken as M1, S1 and F1, said attribution is prescribed in a state associated with any one of (0, 0, 0), (0, 0, 1), (0, 1, 0) and (0, 1, 1) of (M1, S1, F1) in a program area.

6. A data recording method according to claim 3, wherein a prescription on a rewritable attribution or a read only attribution is placed in an Eight to Fourteen Modulation frame (EFM frame) of said optical recording medium.

7. A data recording method according to claim 6, wherein said attribution of a frame specified by a subcode of said optical recording medium prescribed in a state associated with specific two bits in a Q-channel of said subcode.

8. A data recording method according to claim 3, wherein a prescription on a rewritable attribution or a read only attribution is placed in a block of said optical recording medium.

9. A data recording method according to claim 8, wherein said attribution of the optical recording medium of said block is prescribed in a state associated with specific two bits in a plurality of bits describing mode information included in a header of said block.

10. A data recording method according to claim 1, wherein an attribution, on whether or not the optical recording medium is rewritable, includes an attribution on whether or not to be rewritable only one time and an attribution on whether or not to be writable repeatedly.

11. A data recording method according to claim 3, wherein a program area of the optical recording medium is divided into a plurality of sessions according to a prescription of a multisession format so that some of divided sessions are used for read only while the other sessions are made rewritable.

12. A data recording method according to claim 11, wherein said program area of the optical recording medium is divided into a first session comprising read only data having an ISO9660 file structure and a second session comprising a rewritable type area so that user data and lead-out in said first session are handled as read only data while a lead-in area, a program memory area (PMA) and a power calibration area (PCA) are made rewritable.

13. A data recording method according to claim 11, wherein utilizing the optical recording medium wherein, information representative of whether said session pertains to said rewritable attribution or said read only attribution is included in the lead-in area of each session of said multisession format.

14. A data recording method according to claim 11, wherein information representative of an optical recording medium having a first read only area and a rewritable area is included in special information stated with ATIP, of said lead-in area or said lead-in area of the first session of said multisession format.

15. A data recording method according to claim 11, wherein information representative of an optical recording medium having a read only area and a rewritable area is included in EFM data of said lead-in area or said lead-in area of the first session of said multisession format.

16. A data recording method according to claim 1, wherein said optical recording medium having a second read only area in the rewritable area is formed by inhibiting re-write after recording of data in addition to said first read only area.

17. A data recording method according to claim 16, wherein, utilizing the optical recording medium wherein, a predetermined updating-unnecessary application program is stored in said first read only area, and an updating-possible or customized application program is stored in said second read only area, and further a user data recording area capable of recording user data related to at least said application program is provided in said rewritable area.

18. A data recording method according to claim 1, wherein a format of said optical recording medium is a CD-RW format, file management information is written in a lead-in area, a program memory area (PMA) of said optical recording medium, wherein the lead-in area and the program memory area being rewritable.

19. A data recording method according to claim 1, wherein said optical recording medium further includes file management information on a file included in the first read only area and the rewritable area is written in the rewritable area, an application program data is stored in the first read only area, and a user data recording area capable of recording user data related to at least the application program is provided in the rewritable area.

20. A data erasing method for use in a rewritable phase change type optical recording medium having a phase change type recording layer on its substrate and having a first read only area and a rewritable area of the same multilayer structure in its information recording area, wherein the optical recording medium includes data and address information in the first read only area and the rewritable area include basic data units having the same logical structure, auxiliary data capable of distinguishing between read only data and rewritable data is provided in a basic data unit or in a data unit formed by a plurality of basic data units, whereby a groove is formed in the rewritable area to have a wobble made so that a center line thereof shows a predetermined amplitude with respect to a recording/readout optical beam scanning direction, and the data in the first read only area is obtained by a plurality of pre-pits rows made on the substrate, while a center line of a pre-pits row in the first read only area has a wobble to show an amplitude substantially equal to the amplitude of the groove with respect to the optical beam scanning direction, and consecutive address information is given by the wobble of the groove and the wobble of the center line of the pre-pits row, and a carrier frequency due to the wobble of the groove and the wobble of the center line of the pre-pits row is frequency-modulated or phase-modulated with digital information to provide the auxiliary data, identification information representative of an optical recording medium having a first read only area, said identification information is written in a specified area of the optical recording medium in order to make the recording system recognize a rewritable type medium in which the phase change type recording medium partially has the first read only area, and the identification information is previously written on the substrate of the specified area of the optical recording medium as data such as pre-pits or wobbles, and at least a starting address of a the first read only area is previously written on the substrate of the specified area of the optical recording medium as data such as pre-pits or wobbles, wherein file management information on a file included in the first read only area and the rewritable area is written in the rewritable area, wherein the data erasing method, comprising:

recognizing the identification information representative of that a recording medium as of a rewritable type including a first read only area;

acquiring file management information of the first read only area and transferring the file management information to a storage memory;

erasing file management information of the first read only area and the rewritable area, which is written in the file management area of the rewritable area of the recording medium; and recording the file management information of the first read only area, transferred to the storage memory, in the file management area.

21. A data erasing method according to claim 19, said optical recording medium is a rewritable type compact disc with a multisession format having a plurality of session areas each including a lead-in area, said data erasing method is a method of erasing areas of data in a rewritable area of a rewritable type compact disc, said method further comprising:

identifying, on the basis of special information recorded in the lead-in area of the first session area, in the compact disc with the multisession format having the plurality of session areas each including said lead-in area, that said compact disc is of a rewritable type having a first read only area;

extracting an attribution about rewrite, write-once or write inhibit from each of said lead-in areas of said plurality of session areas;

when the attribution extracted in said extracting step is about said write inhibit, transferring said file management information of the write inhibit session area to a storage memory;

erasing said file management information recorded in said lead-in area of said first session area; and recording, in said first session area, said file management information, said file structure of said write inhibit session area transferred to said storage memory, and a starting address of a rewritable area.

* * * * *

UNITED STATES PATENT AND TRADEMARK OFFICE
CERTIFICATE OF CORRECTION

PATENT NO.       : 7,092,335 B2                                    Page 1 of 1
APPLICATION NO.  : 10/686760
DATED            : August 15, 2006
INVENTOR(S)      : M. Horie It is certified that error appears in the above-identified patent and that said Letters Patent is hereby corrected as shown below:

On the cover of the patent, item (73) is deleted and the following is substituted:

(73) Assignee: Mitsubishi Kagaku Media Co., Ltd.,
Tokyo (JP)

Signed and Sealed this

Tenth Day of November, 2009

David J. Kappos
*Director of the United States Patent and Trademark Office*